(12) United States Patent
Kamiyama et al.

(10) Patent No.: US 7,997,241 B2
(45) Date of Patent: Aug. 16, 2011

(54) SPARK IGNITION TYPE INTERNAL COMBUSTION ENGINE

(75) Inventors: Eiichi Kamiyama, Mishima (JP); Yukihiro Nakasaka, Suntou-gun (JP); Daisuke Akihisa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 275 days.

(21) Appl. No.: 12/441,599

(22) PCT Filed: Sep. 19, 2007

(86) PCT No.: PCT/IB2007/002825
§ 371 (c)(1),
(2), (4) Date: Mar. 17, 2009

(87) PCT Pub. No.: WO2008/035200
PCT Pub. Date: Mar. 27, 2008

(65) Prior Publication Data
US 2009/0266338 A1    Oct. 29, 2009

(30) Foreign Application Priority Data
Sep. 22, 2006   (JP) ................. 2006-257601

(51) Int. Cl.
*F01L 1/34* (2006.01)
(52) U.S. Cl. ............ 123/90.17; 123/90.15; 464/160
(58) Field of Classification Search .......... 123/90.15, 123/90.17, 90.16, 90.18; 464/1, 2, 160
See application file for complete search history.

(56) References Cited

U.S. PATENT DOCUMENTS
4,174,683 A   11/1979   Vivian

FOREIGN PATENT DOCUMENTS

| | | |
|---|---|---|
| DE | 35 42 629 | 6/1987 |
| DE | 10 2006 015 887 | 10/2007 |
| DE | 10 2006 018 946 | 10/2007 |
| FR | 786 162 | 8/1935 |
| GB | 2 103 751 | 2/1983 |
| JP | 2001 263099 | 9/2001 |
| JP | 2003 206771 | 7/2003 |
| JP | 2003 314315 | 11/2003 |
| JP | 2004 218551 | 8/2004 |
| JP | 2005 83238 | 3/2005 |
| JP | 2005 325702 | 11/2005 |
| JP | 2006 105095 | 4/2006 |
| WO | 83 00360 | 2/1983 |

*Primary Examiner* — Ching Chang
(74) *Attorney, Agent, or Firm* — Oblon, Spivak, McClelland, Maier & Neustadt, L.L.P.

(57) ABSTRACT

In a spark ignition type internal combustion engine that includes a variable compression ratio mechanism capable of changing the mechanical compression ratio, and a variable valve mechanism capable of changing valve characteristics of an intake valve or an exhaust valve, the variable valve mechanism is mechanically coupled to the variable compression ratio mechanism, and the variable valve mechanism is controlled in accordance with the compression ratio-changing operation amount of the variable compression ratio mechanism. The variable valve mechanism is coupled to the variable compression ratio mechanism without intervention of an electronic control unit. Therefore, the possibility of the interference between a piston and an intake valve resulting from an abnormality in a control system that includes an electronic control unit as an intervening unit can be eliminated.

19 Claims, 19 Drawing Sheets

SPARK IGNITION TYPE INTERNAL COMBUSTION ENGINE

BACKGROUND OF THE INVENTION

1. Field of the Invention

The invention relates to a spark ignition type internal combustion engine.

2. Description of the Related Art

In the related-art, there is a known spark ignition type internal combustion engine that has a variable compression ratio mechanism capable of changing the mechanical compression ratio, and a variable valve mechanism capable of changing a valve characteristic of an intake valve or an exhaust valve (e.g., Japanese Patent Application Publication No. 2001-263099 (JP-A-2001-263099)).

In the related-art variable compression ratio mechanism, the mechanical compression ratio is heightened by lessening the combustion chamber volume measured when the piston is positioned at the compression top dead center. Therefore, when the mechanical compression ratio has been heightened by the variable compression ratio mechanism, the distance between the piston and the cylinder head at the top dead center is relatively short, so that there is possibility of interference between the piston and the intake valve.

Therefore, in Japanese Patent Application Publication No. 2001-263099, when the mechanical compression ratio has been heightened, the variable valve mechanism is controlled so as to retard the valve opening timing of the intake valve or lessen the amount of lift of the intake valve. This can restrain the interference between the piston and the intake valve even when the mechanical compression ratio has been heightened.

Besides, in Japanese Patent Application Publication No. 2001-263099, the variable compression ratio mechanism and the variable valve mechanism have actuators for changing the mechanical compression ratio and the valve characteristic, respectively, and these actuators are connected, independently of each other, to an electronic control device. That is, the variable compression ratio mechanism and the variable valve mechanism are controlled independently of each other by the electronic control device.

However, in the case where the variable compression ratio mechanism and the variable valve mechanism are controlled independently of each other as mentioned above, if an abnormality occurs, for example, in a sensor that detects the amount of control of the variable valve mechanism, an undesired event can occurs, for example, an event where although the mechanical compression ratio is high, the valve opening timing of the intake valve is not retarded, so that the piston and the intake valve interfere with each other. That is, in the case where the aforementioned two mechanisms are controlled independently of each other, there is possibility of the piston and the intake valve interfering with each other if a trouble, such as a failure or the like, occurs in either one of the control systems of the two mechanisms.

SUMMARY OF THE INVENTION

It is an object of the invention to provide a spark ignition type internal combustion engine capable of reliably preventing interference between the piston and the intake or exhaust valve even when an abnormality occurs in an electrical control system of a variable compression ratio mechanism or a variable valve mechanism.

In accordance with a first aspect of the invention, in a spark ignition type internal combustion engine that includes a variable compression ratio mechanism that changes a mechanical compression ratio, and a variable valve mechanism that changes a valve characteristic of an intake valve or an exhaust valve, the variable valve mechanism is mechanically coupled to the variable compression ratio mechanism, and the variable valve mechanism is controlled in accordance with a compression ratio-changing operation amount of the variable compression ratio mechanism. According to the first aspect, since the variable valve mechanism is coupled directly to the variable compression ratio mechanism without intervention of an electronic control unit, the interference between the piston and the intake valve due to an abnormality in a control system that includes the electronic control unit as an intervening unit can be avoided. Herein, the "mechanically coupled" means that, for example, mechanisms or the like are joined to each other via a link mechanism or oil pressure, and are connected together without intervention of a computation processing device such as an electronic control unit or the like. Besides, the "compression ratio-changing operation amount" means an amount of operation performed by the variable compression ratio mechanism to change the compression ratio.

In a second aspect based on the first aspect, the variable valve mechanism may be coupled to the variable compression ratio mechanism via a link mechanism. In a third aspect based on the foregoing aspect, the variable compression ratio mechanism may include an actuator for changing the mechanical compression ratio, and the link mechanism may be coupled to the actuator. In a fourth aspect based on the foregoing aspect, the variable compression ratio mechanism may change the mechanical compression ratio by relatively moving a crankcase and a cylinder head with respect to each other, and the variable valve mechanism may be controlled in accordance with a relative positional relationship between the crankcase and the cylinder head.

In a fifth aspect based on the foregoing aspects, the valve characteristic of the intake valve or the exhaust valve in the variable valve mechanism may be controlled in accordance with the compression ratio-changing operation amount of the variable compression ratio mechanism. In a sixth aspect based on the foregoing aspect, the variable valve mechanism may be an operation angle-changing mechanism that changes an operation angle of the intake valve or the exhaust valve, and the operation angle of the intake valve or the exhaust valve may be controlled so as to lessen if the mechanical compression ratio is heightened by the variable compression ratio mechanism. In a seventh aspect based on the foregoing aspect, the variable valve mechanism may be a lift amount-changing mechanism that changes a lift amount of the intake valve or the exhaust valve, and the lift amount of the intake valve or the exhaust valve may be controlled so as to lessen if the mechanical compression ratio is heightened by the variable compression ratio mechanism.

In an eighth aspect based on the foregoing aspect, the spark ignition type internal combustion engine further may include a non-coupled variable valve mechanism that is not mechanically coupled to the variable compression ratio mechanism, separately from the variable valve mechanism, and the non-coupled variable valve mechanism may change a phase angle of at least one of the intake valve and the exhaust valve that is a valve characteristic, of the aforementioned valve characteristic of the intake valve or the exhaust valve, which is different from the valve characteristic that is changed by the variable valve mechanism. In a ninth aspect based on the foregoing aspect, the non-coupled variable valve mechanism may be a phase angle-changing mechanism that changes a phase angle of the intake valve, and the phase angle of the intake valve may be advanced if an engine load lessens. In a tenth aspect based on the foregoing aspect, the variable valve mechanism may be a phase angle-changing mechanism that changes the phase angle of the intake valve, and the phase angle of the intake valve may be controlled to a retarded side if the mechanical compression ratio is heightened by the variable compression ratio mechanism.

In an eleventh aspect based on the foregoing aspect, the variable valve mechanism may change the valve characteristic of the intake valve or the exhaust valve in the variable valve mechanism in accordance with the compression ratio-changing operation amount of the variable compression ratio mechanism and also with an engine operation parameter other than the compression ratio-changing operation amount of the variable compression ratio mechanism, and a range of the valve characteristic of the intake valve or the exhaust valve in which the valve characteristic is changeable in accordance with the engine operation parameter other than the compression ratio-changing operation amount of the variable compression ratio mechanism may be controlled in accordance with the compression ratio-changing operation amount of the variable compression ratio mechanism. In a twelfth aspect based on the foregoing aspect, the variable valve mechanism may change an operation angle of the intake valve or the exhaust valve, of the aforementioned valve characteristic, and an upper limit value of the range of the operation angle in which the operation angle is changeable may be lessened if the mechanical compression ratio is heightened by the variable compression ratio mechanism. In a thirteenth aspect based on the foregoing aspect, the variable valve mechanism may change a lift amount of the intake valve of the exhaust valve, of the aforementioned valve characteristic, and an upper limit value of the range of the lift amount in which the lift amount is changeable may be lessened if the mechanical compression ratio is heightened by the variable compression ratio mechanism.

In a fourteenth aspect based on the foregoing aspect, the variable valve mechanism may change a phase angle of the intake valve, of the aforementioned valve characteristic, and an advanced-side limit angle of the range of the phase angle in which the phase angle is changeable may be retarded if the mechanical compression ratio is heightened by the variable compression ratio mechanism. In a fifteenth aspect based on the foregoing aspect, the spark ignition type internal combustion engine may further include a non-coupled variable valve mechanism that is not mechanically coupled to the variable compression ratio mechanism, separately from the variable valve mechanism, and the non-coupled variable valve mechanism may change a valve characteristic, of the aforementioned valve characteristic, which is different from the valve characteristic that is changed by the variable valve mechanism. In a sixteenth aspect based on the foregoing aspect, the variable valve mechanism may be controlled in accordance with the compression ratio-changing operation amount of the variable compression ratio mechanism so that a distance between a piston and the intake valve or the exhaust valve when the piston is at a compression top dead center is substantially constant.

According to the invention, interference between the piston and the intake valve can be reliably prevented, even in the case where an abnormality occurs in an electrical control system of the variable compression ratio mechanism or the variable valve mechanism.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
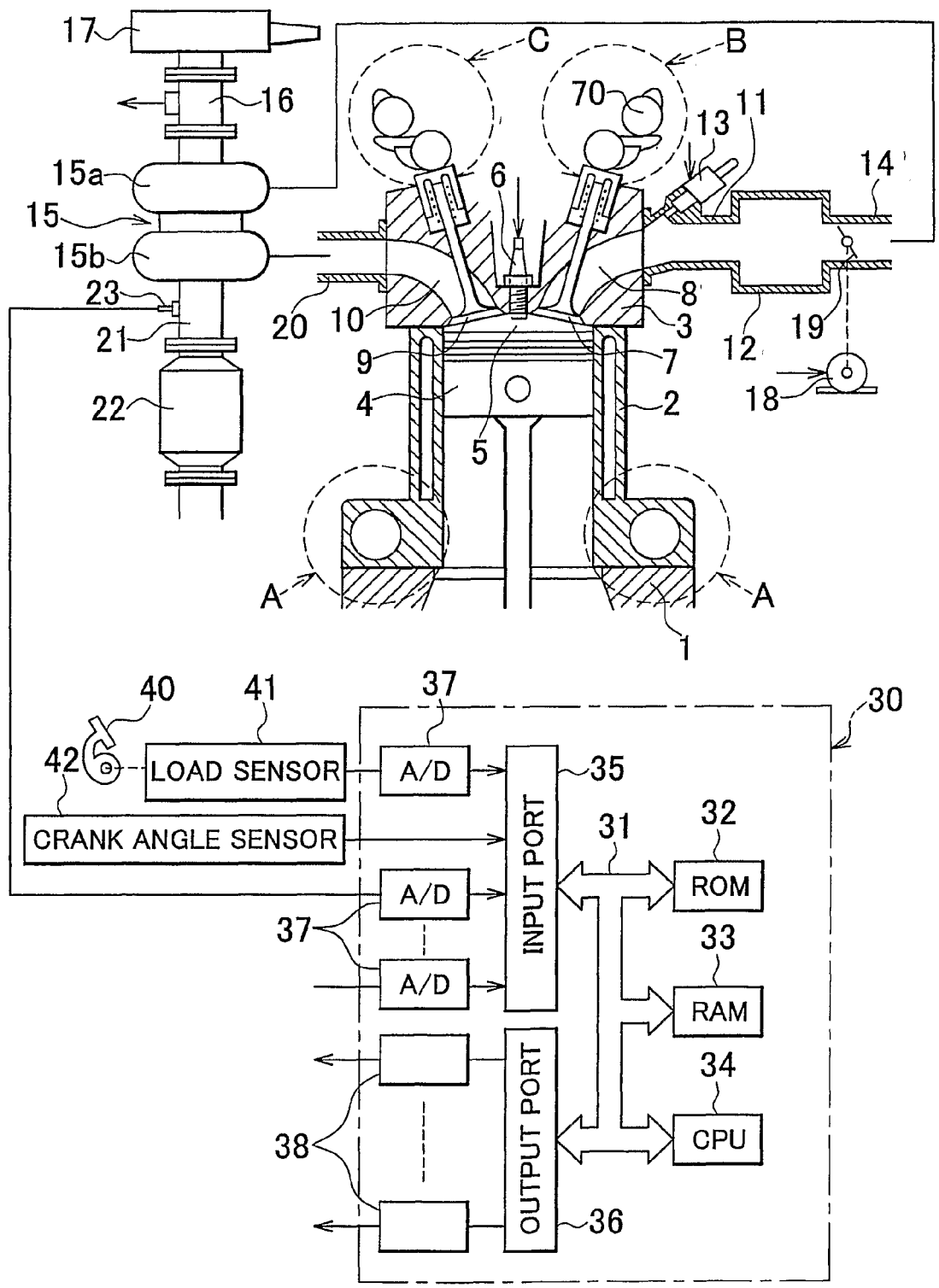
FIG. 1 is an overall diagram of a spark ignition type internal combustion engine.

FIG. 1 shows a side sectional view of a spark ignition type internal combustion engine. FIG. 1 shows a crankcase 1, a cylinder block 2, a cylinder head 3, a piston 4, a combustion chamber 5, an ignition plug 6 disposed in a central portion of an uppermost surface of the combustion chamber 5, an intake valve 7, an intake port 8, an exhaust valve 9, and an exhaust port 10. The intake port 8 is connected to a surge tank 12 via an intake branch pipe 11. Each intake branch pipe 11 is provided with a fuel injection valve 13 that injects fuel into a corresponding one of the intake ports 8. In addition, the fuel injection valves 13 may be disposed in the combustion chambers 5 instead of being mounted on the intake branch pipes 11.

The surge tank 12 is connected to an outlet opening of a compressor 15a of an exhaust turbocharger 15 via an intake duct 14. An inlet opening of the compressor 15a is connected to an air cleaner 17, for example, via an intake air amount detector 16 that employs, for example, a heat wire. A throttle valve 19 that is driven by an actuator 18 is disposed in the intake duct 14.

On the other hand, the exhaust ports 10 are connected to an inlet opening of an exhaust turbine 15b of the exhaust turbocharger 15 via an exhaust manifold 20. An outlet opening of the exhaust turbine 15b is connected, via an exhaust pipe 21, to a catalytic converter 22 that contains an exhaust purification catalyst. In the exhaust pipe 21, an air-fuel ratio sensor 23 is disposed.

In the embodiment shown in FIG. 1, a variable compression ratio mechanism A capable of changing the volume of the combustion chamber 5 measured when the piston 4 is positioned at the compression top dead center (TDC), by changing the relative position of the crankcase 1 and the cylinder block 2 in the cylinder axis direction, is provided at a coupling portion between the crankcase 1 and cylinder block 2. Furthermore, the embodiment includes an intake variable valve mechanism B capable of changing a valve characteristic of the intake valve 7, and an exhaust variable valve mechanism C capable of changing the valve characteristic of the exhaust valve 9.

An electronic control unit 30 is made up of a digital computer, and has a bidirectional buss 31, a ROM (read-only memory) 32, a RAM (random access memory) 33, a CPU (microprocessor) 34, an input port 35, and an output port 36. An output signal of the intake air amount detector 16 and an output signal of the air-fuel ratio sensor 23 are input to the input port 35 via corresponding AD converters 37. Besides, a load sensor 41 that generates output voltage proportional to the amount of depression of an accelerator pedal 40 is connected to the accelerator pedal 40. An output voltage of the load sensor 41 is input to the input port 35 via a corresponding AD converter 37. Furthermore, a crank angle sensor 42 that generates an output pulse every time a crankshaft rotates, for example, 30°, is connected to the input port 35. On the other hand, the output port 36 of the electronic control unit 30 is connected to the ignition plug 6, the fuel injection valve 13, the throttle valve-driving actuator 18, and the variable compression ratio mechanism A, via corresponding drive circuits 38.

Figure 2:
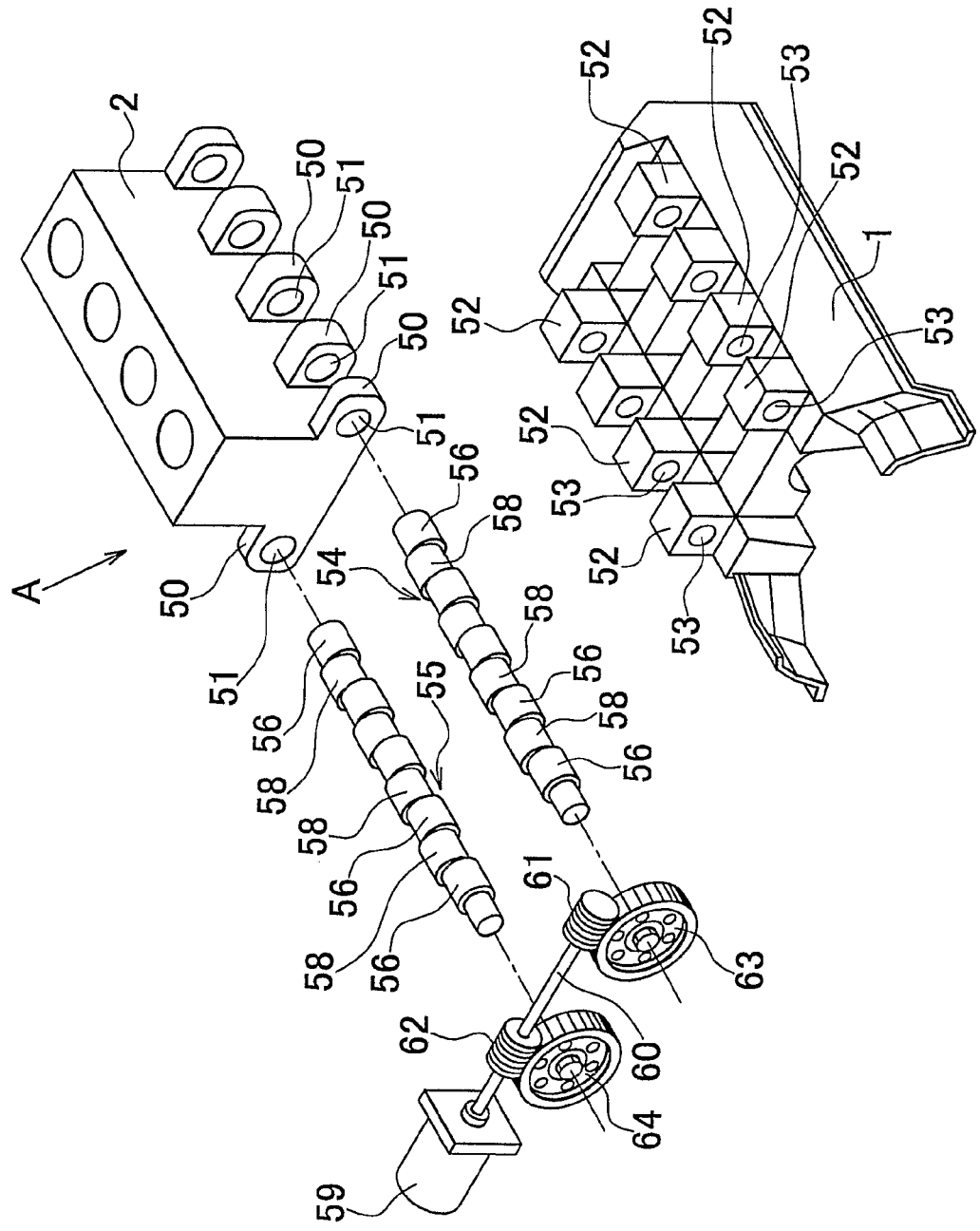
FIG. 2 is an exploded perspective view of a variable compression ratio mechanism.
Figure 3A:
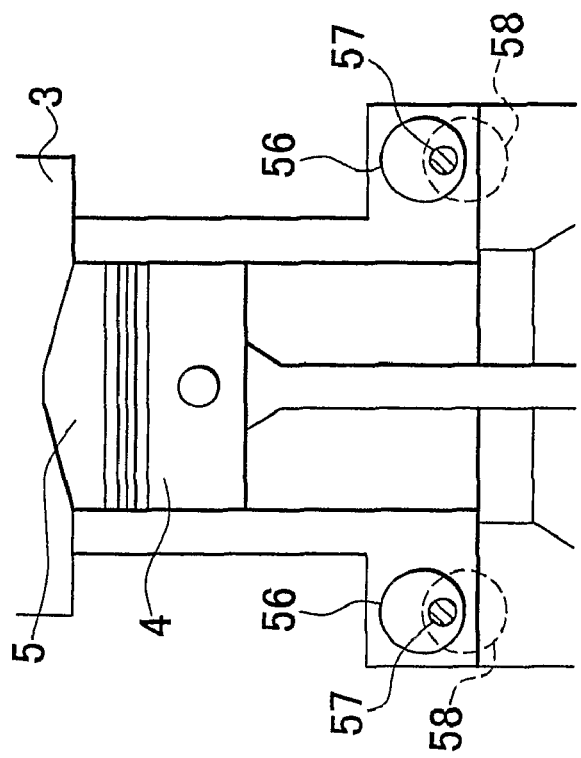
FIGS. 3A and 3B are diagrammatical side sectional views of an internal combustion engine.
Figure 3B:
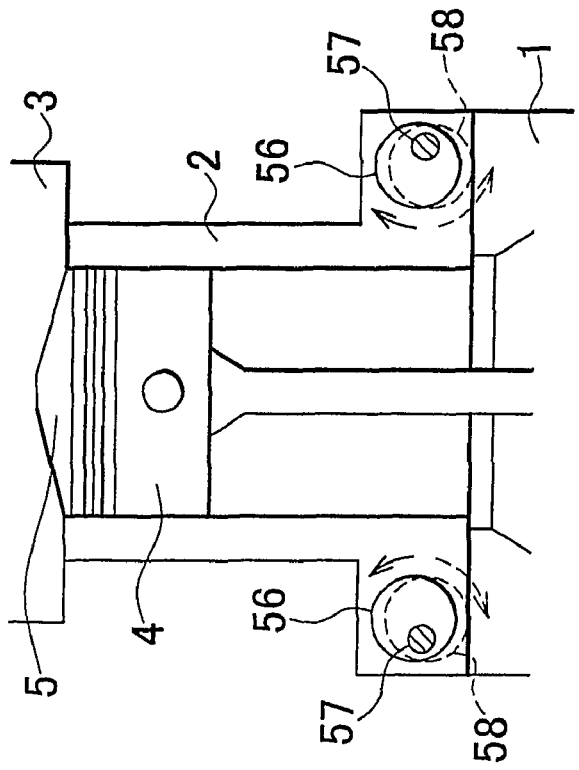

FIG. 2 is an exploded perspective view of the variable compression ratio mechanism A shown in FIG. 1. FIGS. 3A and 3B are diagrammatically shown side sectional views of the internal combustion engine. Referring to FIG. 2, a lower portion of each of two side walls of the cylinder block 2 has a plurality of protruded portions 50 that are spaced from each other. Each protruded portion 50 has a cam insert hole 51 that is circular in section. On the other hand, an upper wall surface of the crankcase 1 has a plurality of protruded portions 52 spaced from each other which are fitted between the corresponding protruded portions 50. Each protruded portion 52 also has a cam insert hole 53 that is circular in section.

As shown in FIG. 2, a pair of camshafts 54, 55 are provided. Each of the camshafts 54, 55 has a plurality of circular cams 56 each of which is rotatably inserted into a corresponding one of the cam insert holes 51. That is, the circular cams 56 are fixed to the camshafts 54, 55 at positions that correspond to the positions of the cam insert holes 51. Each of the circular cams 56 has the same rotation axis as a corresponding one of the cam shafts 54, 55. In the camshafts 54 and 55, eccentric shafts 57 extend respectively as shown by hatching in FIGS. 3A and 3B. The eccentric shafts 57 of each camshaft 54, 55 are disposed eccentrically from the rotation axis of the camshaft. Circular cams 58 different from the circular cams 56 are mounted on the eccentric shafts 57 so as to be eccentrically rotatable. As shown in FIG. 2, the circular cams 58 are disposed between the circular cams 56s, and each of the circular cams 58s is inserted into a corresponding one of the cam insert holes 53.

If from a state as show in FIG. 3A, the camshafts 54, 55 to which the circular cams 56 fixed are rotated in opposite directions shown by solid-line arrows in FIG. 3A, the eccentric shafts 57 move toward a lower middle position, so that the circular cams 58 rotate in the cam insert holes 53 in the rotation direction opposite to the rotation direction of the circular cams 56, as shown by dashed-line arrows in FIG. 3A. Therefore, when the eccentric shafts 57 move to the lower middle as shown in FIG. 3B, the center axis of the circular cams 58 moves to a position under the eccentric shafts 57.

As can be seen from the comparison between FIG. 3A and FIG. 3B, the relative positions of the crankcase 1 and the cylinder block 2 are determined by the distance between the center of the circular cams 56 and the center of the circular cams 58, and the cylinder block 2 becomes further apart from the crankcase 1 as the distance between the center of the circular cams 56 and the center of the circular cams 58 becomes greater. As the cylinder block 2 moves apart from the crankcase 1, the volume of the combustion chamber 5 measured when the piston 4 is positioned at the compression top dead center increases. Thus, the volume of the combustion chamber 5 measured when the piston 4 is positioned at the compression top dead center can be changed by rotating the camshafts 54, 55.

As shown in FIG. 2, in order to rotate the camshafts 54, 55 in directions opposite to each other, a pair of worm gears 61, 62 whose spiral directions are opposite to each other are mounted on the rotation shaft of a drive motor 59. Gears 63, 64 meshing with the worm gears 61, 62 are fixed to end portions of the camshafts 54, 55, respectively. In this embodiment, by driving the drive motor 59, the volume of the combustion chamber 5 when the piston 4 is positioned at the compression top dead center can be changed over a wide range. Incidentally, the variable compression ratio mechanism A shown in FIGS. 1 to 3A and 3B is merely illustrative, and any type of variable compression ratio mechanism may be used in the invention.

Figure 4:
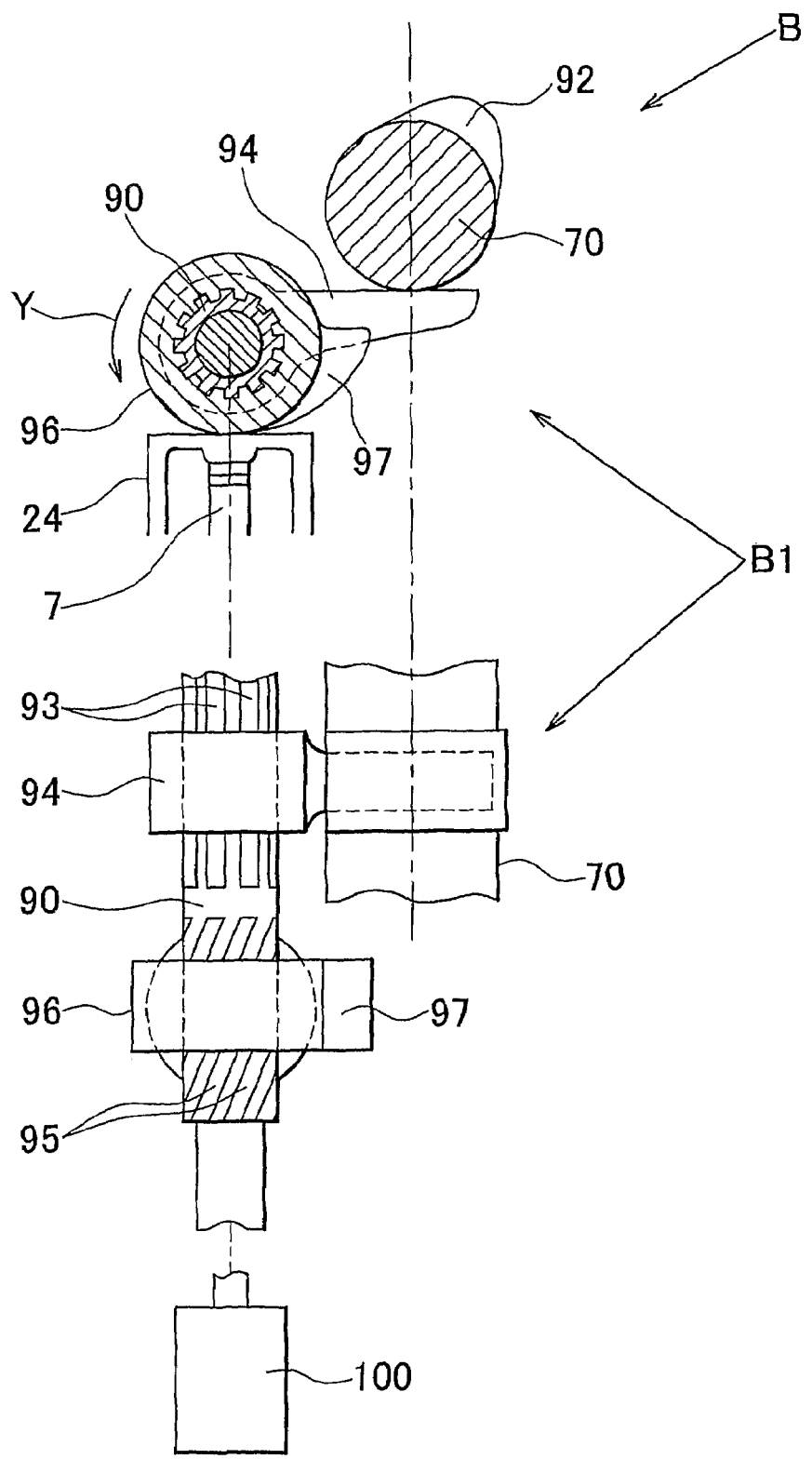
FIG. 4 is a diagram showing a variable valve mechanism of a first embodiment of the invention.

FIG. 4 shows an intake variable valve mechanism B that is provided for a camshaft 70 that is employed to drive the intake valve 7 shown in FIG. 1. As shown in FIG. 4, this embodiment has, as an intake variable valve mechanism B, an operation angle-changing mechanism B1 that is disposed between the camshaft 70 and a valve lifter 24 of the intake valve 7 and that changes the operation angle of a cam of the camshaft 70 and transmits the changed operation angle to the intake valve 7. Incidentally, FIG. 4 shows a side sectional view and a plan view of the operation angle-changing mechanism B1.

The operation angle-changing mechanism B1 of the intake variable valve mechanism B will be described. This operation angle-changing mechanism B1 includes a control rod 90 that is disposed parallel to the camshaft 70 and that is moved in the direction of the axis thereof by a link mechanism 100 described below, an intermediate cam 94 that engages with a cam 92 of the camshaft 70 and that is slidably fitted to a spline 93 that is formed on the control rod 90 and extends in the direction of the axis, and an oscillating cam 96 that engages with the valve lifter 24 in order to drive the intake valve 7 and that is oscillatably fitted to a spline 95 that is formed on the control rod 90 and extends in a spiral fashion. A cam 97 is formed on the oscillating cam 96.

When the camshaft 70 rotates, the intermediate cam 94 is oscillated through a constant angle by the cam 92, and therefore the oscillating cam 96 is also oscillated through the constant angle. The intermediate cam 94 and the oscillating cam 96 are supported so as to be immovable in the direction of the axis of the control rod 90. Therefore, when the control rod 90 is moved in the direction of the axis by the link mechanism 100, the oscillating cam 96 is rotated relative to the intermediate cam 94.

Figure 5:
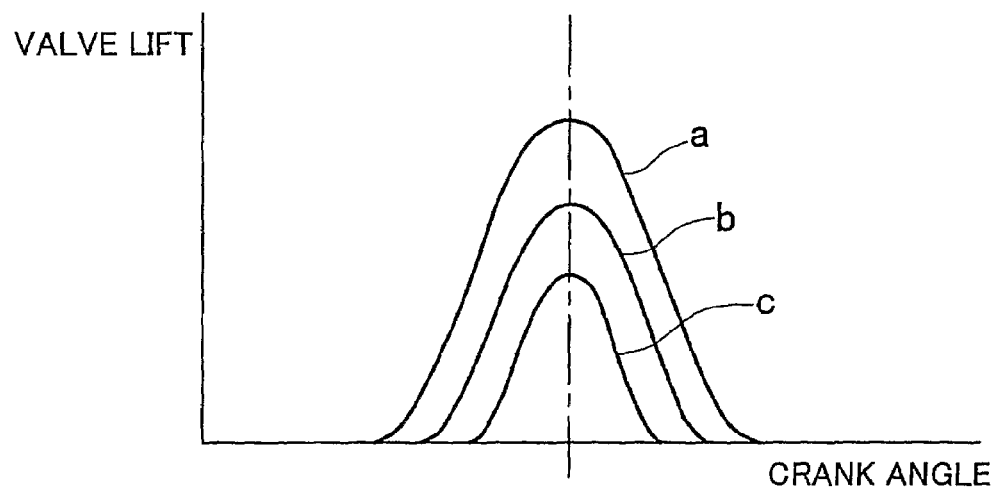
FIG. 5 is a diagram showing the operation angle and the amount of lift of an intake valve or an exhaust valve.

In the case where as soon as the cam 92 of the camshaft 70 begins to engage with the intermediate cam 94, the cam 97 of the oscillating cam 96 begins to engage with the valve lifter 24 due to the relative rotational positional relationship between the intermediate cam 94 and the oscillating cam 96, the open valve period (i.e., the operation angle) and the amount of lift of the intake valve 7 become the greatest as shown by a in FIG. 5. If from this state, the oscillating cam 96 is relatively rotated in the direction of an arrow Y in FIG. 4 with respect to the intermediate cam 94 by the link mechanism 100, the engagement of the cam 92 of the camshaft 70 with the intermediate cam 94 is followed by a certain amount of time before the cam 96 of the oscillating cam 96 engages with the valve lifter 24. In this case, as shown by b in FIG. 5, the open valve period and the amount of lift of the intake valve 7 become smaller than in the case shown by a.

If the oscillating cam 96 is relatively rotated further in the direction of the arrow Y in FIG. 4 with respect the intermediate cam 94, the open valve period and the amount of lift of the intake valve 7 become further smaller, as shown by c in FIG. 5. That is, the open valve period of the intake valve 7 can be freely varied to a given duration by changing the relative rotational position between the intermediate cam 94 and the oscillating cam 96 via the link mechanism 100. Incidentally, in this case, the amount of lift of the intake valve 7 becomes smaller as the open valve period of the intake valve 7 becomes shorter.

In this manner, the open valve period (i.e., the operation angle) and the amount of lift of the intake valve 7 can be changed by the operation angle-changing mechanism B1.

Incidentally, the operation angle-changing mechanism B1 shown in FIGS. 1 and 4 is merely illustrative, and any of various types of operation angle-changing mechanisms other than the type shown in FIGS. 1 and 4 may be used in the invention. Besides, the exhaust variable valve mechanism C has basically the same construction as the intake variable valve mechanism B, and is capable of changing the open valve period (operation angle) and the amount of lift of the exhaust valve 9.

FIGS. 6 and 7A to 7C show the link mechanism 100 provided for controlling the operation angle-changing mechanism B1 of the variable valve mechanism B, that is, for moving the control rod 90 in the direction of the axis. As shown in FIGS. 6 and 7A to 7C, the link mechanism 100 has a stationary-side member 101 coupled to the crankcase 1, and a mobile-side member 102 coupled to the cylinder block 2 or the cylinder head 3 (the cylinder head 3 in this embodiment). The stationary-side member 101 is a substantially linear member, and an end portion thereof is fixed to the crankcase 1, and another end portion thereof is provided with a pin 103. On the other hand, the mobile-side member 102 is an "L"-shape member having two leg portions 102a, 102b. A distal end of a leg portion 102a of the two leg portions is provided with a slot 104 that extends in the direction of an axis of the leg portion, and a distal end portion of the other leg portion 102b is coupled to the control rod 90.

A joining portion between the two leg portions 102a, 102b of the mobile-side member 102 is coupled to an oscillating shaft 105, so that the mobile-side member 102 is oscillatable about the oscillating shaft 105. The oscillating shaft 105 is coupled to a head-fixed member 106 that is fixed to the cylinder head 3. The pin 103 of the stationary-side member 101 is fitted in the slot 104 of the mobile-side member 102 so that the pin 103 is slidable in the slot 104.

Figure 6:
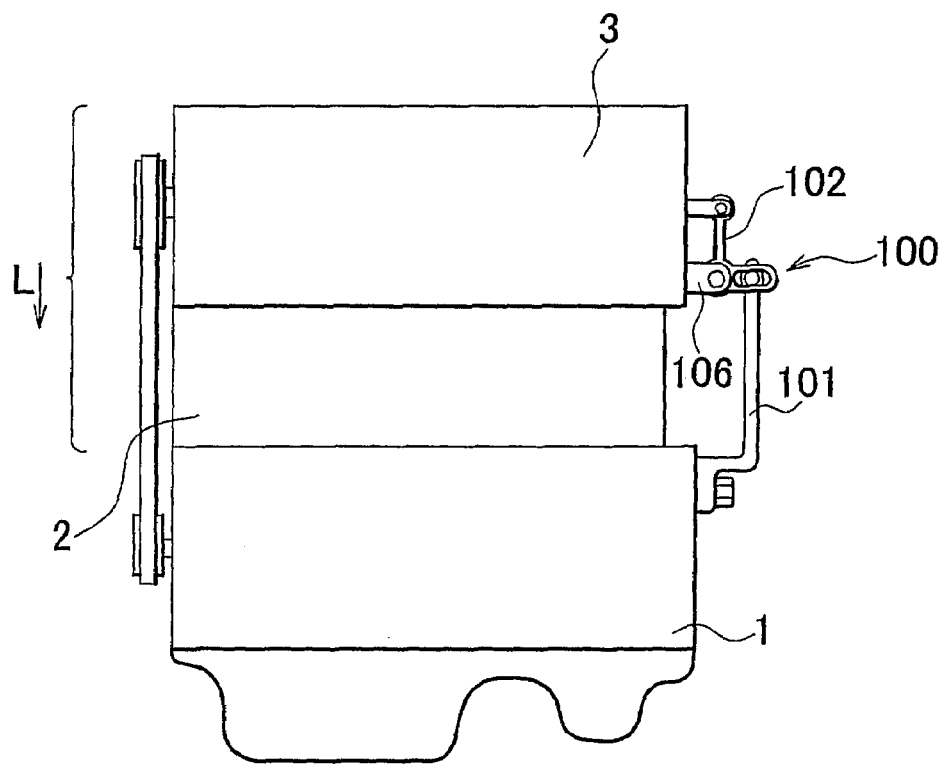
FIG. 6 is a diagram showing an engine body and a link mechanism.
Figure 7A:
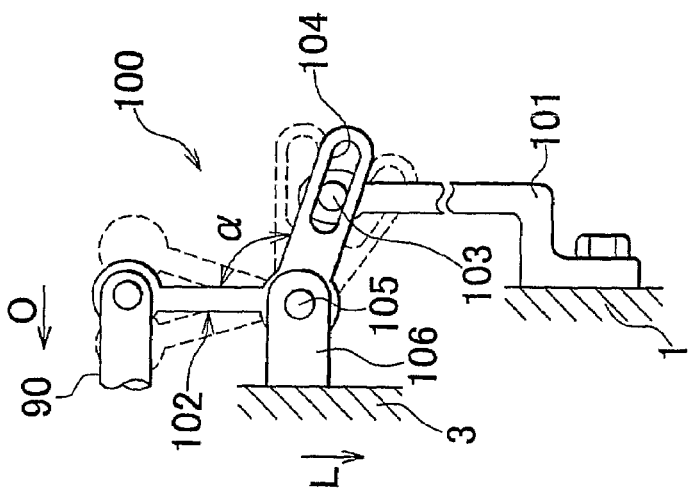
FIGS. 7A, 7B and 7C are enlarged diagrams of the link mechanism shown in FIG. 6.

When the cylinder head 3 is moved so as to approach the crankcase 1 by the operation of the variable compression ratio mechanism A (in the direction shown by arrows L in FIGS. 6 and 7A to 7C), the leg portion 102a of the mobile-side member 102 is pushed up by the pin 103, pivoting to a position M shown by a dashed line in FIG. 7A. Along with this motion, the mobile-side member 102 pivots about the oscillating shaft 105, so that the control rod 90 is moved in the direction shown by arrows O.

Conversely, if the cylinder head 3 is moved away from the crankcase 1 (in the direction opposite to the direction of the arrow L in the drawings) by the operation of the variable compression ratio mechanism A, the leg portion 102a of the mobile-side member 102 is pushed down by the pin 103, pivoting to a position N shown by a dashed line in FIG. 7A. Along with this motion, the mobile-side member 102 pivots about the oscillating shaft 105, so that the control rod 90 is moved in the direction opposite to the direction of the arrow O.

The operation angle-changing mechanism of the exhaust variable valve mechanism C is also coupled to the variable compression ratio mechanism A by a link mechanism in substantially the same manner as described above.

Figure 8A:
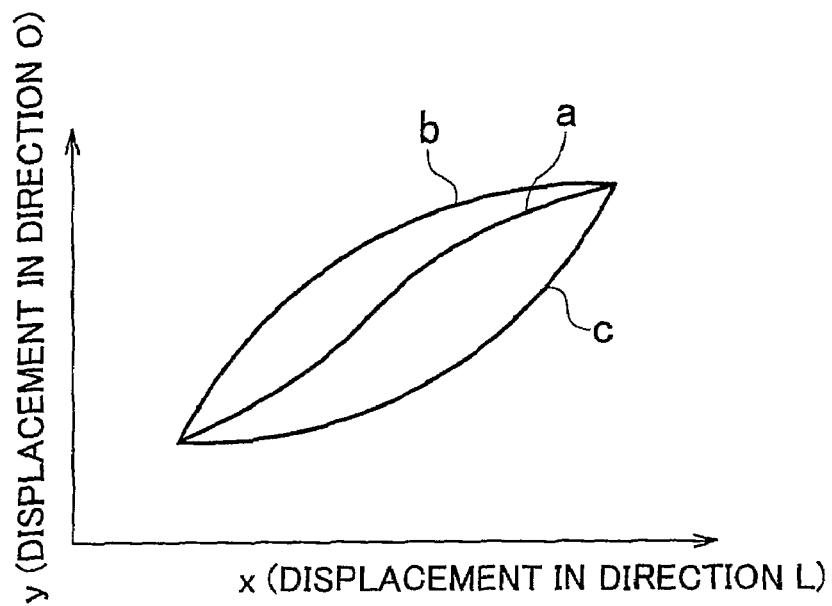
FIGS. 8A and 8B are diagrams showing a relationship regarding the displacement caused by the link mechanism, and a relationship between the mechanical compression ratio and the operation angle, respectively.
Figure 8B:
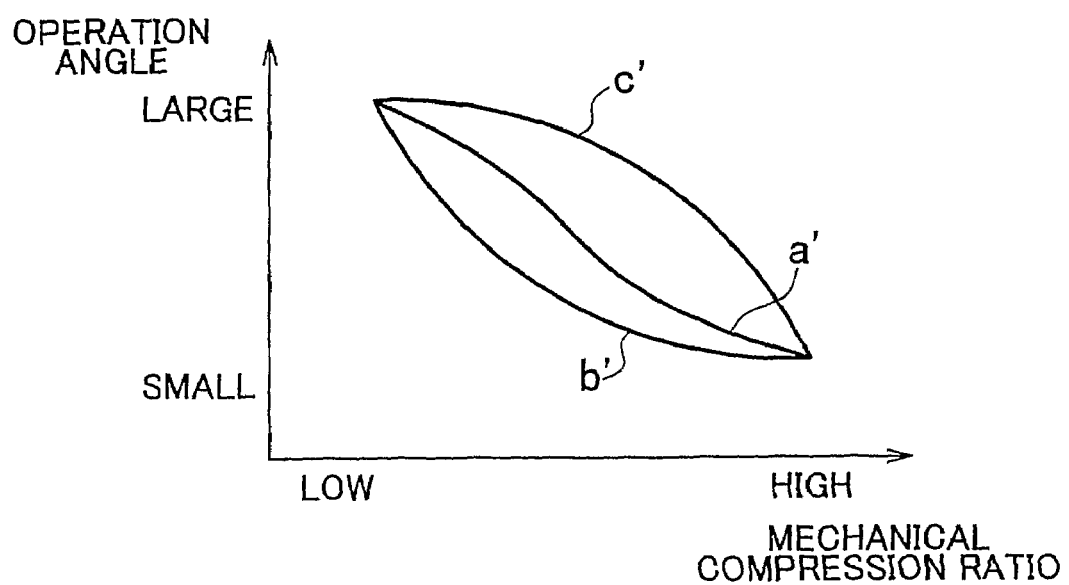

Next, with reference to FIG. 7A and FIGS. 8A and 8B, the operation of the variable compression ratio mechanism A and the intake variable valve mechanism B constructed as described above will be described. FIG. 8A is a diagram showing a relationship between the displacement x of the cylinder head 3 in the direction of the arrow L and the displacement y of the control rod 90 in the direction of the arrow O. FIG. 8B is a diagram showing a relationship between the mechanical compression ratio determined by the variable compression ratio mechanism A and the operation angle of the intake valve 7 determined by the operation angle-changing mechanism B1. The following description will be given in conjunction with a case where the exhaust variable valve mechanism C is not operated, that is, a case where the operation angle and the amount of lift of the exhaust valve 9 remain unchanged, as an example. However, substantially the same control as described below can also be performed for the exhaust variable valve mechanism C.

In the case of the link mechanism 100 constructed as shown in FIG. 7A, the displacement x and the displacement y have a relationship shown by a curve a in FIG. 8A. That is, when the displacement x of the cylinder head 3 in the direction of the arrow L is small, the displacement y of the control rod 90 in the direction of the arrow O is also small. Due to the operation of the variable compression ratio mechanism, as the displacement x of the cylinder head 3 in the direction of the arrow L becomes larger, the displacement y becomes larger.

In this embodiment, the variable compression ratio mechanism A is constructed so that the mechanical compression ratio heightens if the cylinder block 2 and the cylinder head 3 move toward the crankcase 1, as described above. The operation angle-changing mechanism B1 of the intake variable valve mechanism B is constructed so that the operation angle and the amount of lift of the intake valve 7 become smaller if the control rod 90 moves in the direction of the arrow O in FIG. 7A.

Therefore, when the mechanical compression ratio determined by the variable compression ratio mechanism A is low, the displacement x of the cylinder head 3 in the direction of the arrow L is small, and therefore the displacement y of the control rod 90 is also small, so that the operation angle and the amount of lift of the intake valve 7 are large. Conversely, if the mechanical compression ratio becomes higher, the displacement x of the cylinder head 3 in the direction of the arrow L becomes larger, and therefore the displacement y of the control rod 90 becomes also large, so that the operation angle and the amount of lift of the intake valve 7 become smaller. That is, the variable compression ratio mechanism A and the operation angle-changing mechanism B1 operate due to the link mechanism 100 so that the mechanical compression ratio and the operation angle have a relationship as shown by a curve a' in FIG. 8B.

Figure 9A:
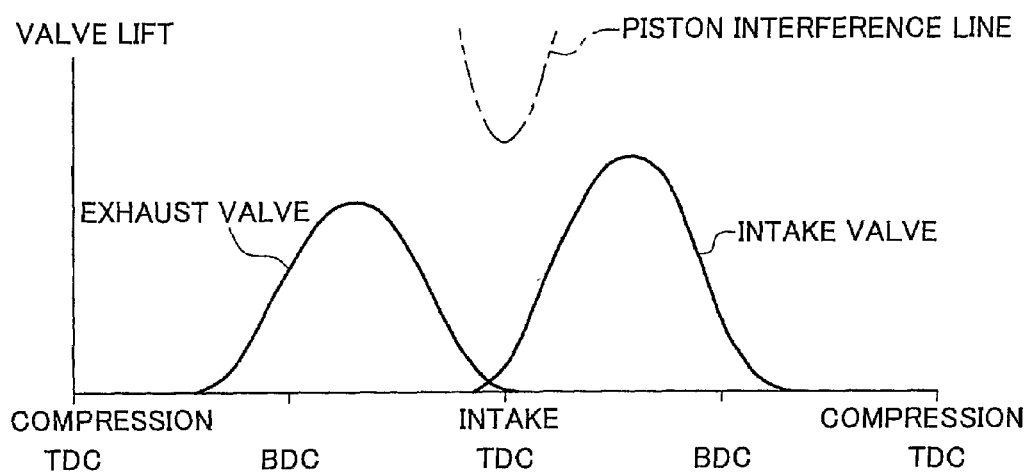
FIGS. 9A and 9B are diagrams each showing changes in the lift of the intake valve and of the exhaust valve, and a piston interference line.
Figure 9B:
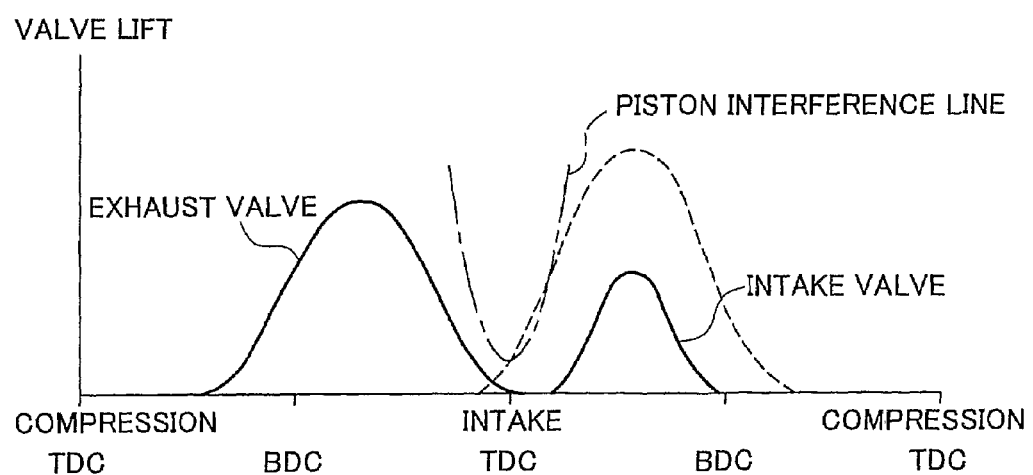

FIGS. 9A and 9B each show changes in the lift of the intake valve 7, changes in the lift of the exhaust valve 9, and a piston interference line that indicates a limit of interference of the intake valve 7 or the exhaust valve 9 with the piston 4. In FIGS. 9A and 9B, if the lift curve of the exhaust valve 9 intersects with the piston interference line, the exhaust valve 9 interferes with the piston 4, and if the lift curve of the intake valve 7 intersects with the piston interference line, the intake valve 7 interferes with the piston 4.

FIG. 9A shows changes in the lift of the valves and the like when the mechanical compression ratio is relatively low. In this case, even when the piston 4 is positioned at the top dead center, the upper surface of the piston 4 and the upper surface of the combustion chamber 5 are relatively apart from each other, so that the piston interference line is at a high position as shown in FIG. 9A. Therefore, as described above, if the operation angle and the amount of lift of the intake valve 7 are made larger when the mechanical compression ratio is low, the problem of interference between the piston 4 and the intake valve 7 does not occur.

FIG. 9B shows changes in the lift of the intake valve 7, changes in the lift of the exhaust valve 9, and a piston interference line. If the mechanical compression ratio becomes high, the clearance between the upper surface of the piston 4 and the upper surface of the combustion chamber 5 occurring when the piston 4 is positioned at the top dead center is small; therefore, the problem of the interference between the piston 4 and the intake valve 7 occurs if the operation angle and the amount of lift of the intake valve 7 are large as shown by a dashed line in FIG. 9B.

In this embodiment, if the mechanical compression ratio becomes high, the operation angle and the amount of lift of the intake valve 7 are made small as described above, so that the lift change of the intake valve 7 becomes as shown by a solid line in FIG. 9B. Therefore, even when the mechanical compression ratio becomes high, the interference between the piston 4 and the intake valve 7 can be prevented.

In particular, in the embodiment, the operation angle of the intake valve 7 in the operation angle-changing mechanism B1 is changed in accordance with the positional relationship between the cylinder head 3 and crankcase 1 that are relatively moved by the variable compression ratio mechanism A, that is, in accordance with the mechanical compression ratio set by the variable compression ratio mechanism A. In other words, in this embodiment, the variable compression ratio mechanism A is coupled to the operation angle-changing mechanism B1 via a mechanical link mechanism without intervention of the electronic control unit 30, the variable valve mechanism B is controlled in accordance with the amount of operation for changing the compression ratio via the variable compression ratio mechanism A (hereinafter, referred to as "compression ratio-changing operation amount"), or in accordance with the mechanical compression ratio set by the variable compression ratio mechanism A.

It is to be noted herein that in the case where the variable compression ratio mechanism A and the operation angle-changing mechanism B are electrically controlled independently of each other by the electronic control unit 30, the control becomes complicated and, at the same time, the piston 4 and the intake valve 7 will interfere with each other if an abnormality should occur in a portion of the control system. According to the embodiment, however, the variable compression ratio mechanism A and the operation angle-changing mechanism B1 are coupled via a mechanical link mechanism, and the possibility of an abnormality occurring in the link mechanism is very low in comparison with the possibility of an abnormality occurring in the control system that is complicated as described above. Thus, the embodiment is able to reliably prevent interference between the piston 4 and the intake valve 7.

Incidentally, the variable valve mechanism may be controlled in any manner as long as the operation angle becomes smaller if the mechanical compression ratio becomes higher, in order to reliably prevent interference between the piston 4 and the intake valve 7. For example, the variable valve mechanism may be controlled in accordance with the compression ratio-changing operation amount of the variable compression ratio mechanism so that the distance between the piston 4 and the intake valve 7 measured when the piston 4 is positioned at the compression top dead center is substantially constant.

Figure 7B:
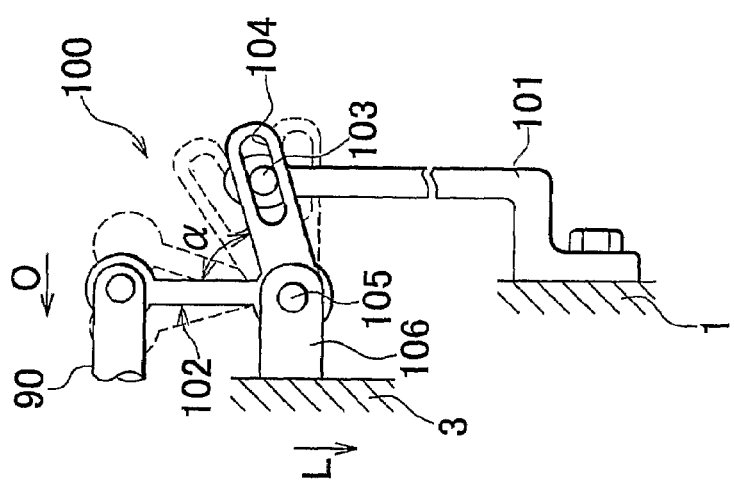

According to the embodiment, the relationship between the mechanical compression ratio determined by the variable compression ratio mechanism A and the operation angle determined by the operation angle-changing mechanism B1 can be changed merely by changing the angle α between the two leg portions 102a, 102b of the mobile-side member 102 of the link mechanism 100. For example, if the angle α between the two leg portions 102a, 102b is made small as shown in FIG. 7B, the displacement x in the direction L and the displacement y in the direction O have a relationship as shown by a curve b in FIG. 8A, so that the operation angle and the mechanical compression ratio have a relationship as shown by a curve b' in FIG. 8B. That is, the operation angle with respect to the mechanical compression ratio becomes smaller in this case than in the case where the mobile-side member 102 is constructed as shown in FIG. 7A.

Figure 7C:
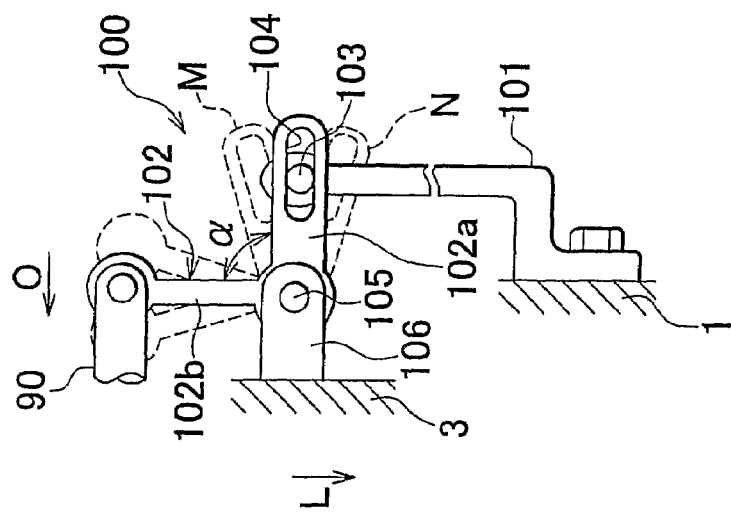

Conversely, if the angle α between the two leg portions 102a, 102b is made large as shown in FIG. 7C, the displacement x in the direction t and the displacement y in the direction O have a relationship as shown by a curve c shown in FIG. 8A, so that the mechanical compression ratio and the operation angle have a relationship as shown by a curve c' in FIG. 8B. Specifically, the operation angle with respect to the mechanical compression ratio becomes larger in this case than in the case where the mobile-side member 102 is constructed as shown in FIG. 7C.

The above-described link mechanism is merely illustrative, and any of various other link mechanisms may be used as long as it can control the variable valve mechanism in accordance with the mechanical compression ratio or the compression ratio-changing operation amount of the variable compression ratio mechanism.

The link mechanism can be used not only for the above-described type of the variable compression ratio mechanism and the above-described type of the operation angle-changing mechanism, but can also be used for other various types of variable compression ratio mechanisms and operation angle-changing mechanisms For example, for an operation angle-changing mechanism capable of changing the operation angle and the amount of lift of the intake valve by moving the camshaft itself in the direction of the axis, substantially the same mechanism as the foregoing link mechanism is employed to move the camshaft in the direction of the axis.

Figure 10:
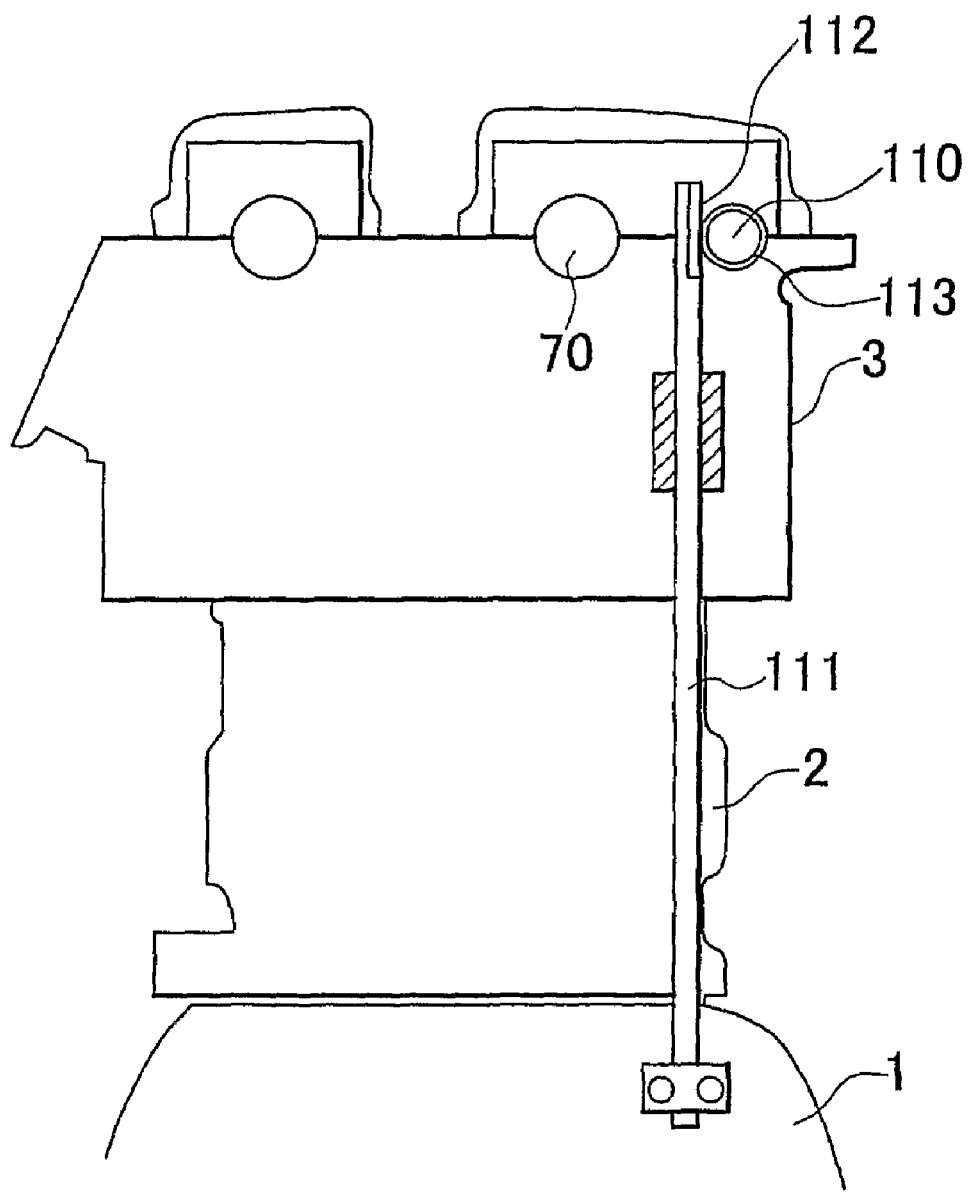
FIG. 10 is a diagram showing another example of a link mechanism.

For example, if the operation angle-changing mechanism is of a type that changes the operation angle and the amount of lift of the valve by rotating a control rod, for example, a link mechanism as shown in FIG. 10 may be adopted. In FIG. 10, the link mechanism has a coupling rod 111 one of whose end portions has a rack 112, and another one of whose end portions is fixed to a crankcase 1. The control rod 110 of the operation angle-changing mechanism is provided with a pinion 113. The rack 112 and the pinion 113 are meshed with each other. Therefore, the control rod 110 can be rotated in accordance with the relative movement between the crankcase 1 and the cylinder head 3.

Although in the embodiment, the link mechanism is caused to control the operation angle-changing mechanism by taking advantage of the relative motion between the crankcase 1 and the combination of the cylinder block 2 or the cylinder head 3, the variable compression ratio mechanism A may be coupled to the link mechanism in any manner as long as the operation angle and the amount of lift of the intake valve or the exhaust valve can be changed in accordance with the mechanical compression ratio or the compression ratio-changing operation amount of the variable compression ratio mechanism; for example, the link mechanism may be directly coupled to the actuator 59 of the variable compression ratio mechanism A, or the like.

Furthermore, in the foregoing embodiment, the variable compression ratio mechanism A and the operation angle-changing mechanism B1 are coupled by a mechanical link mechanism. However, the variable compression ratio mechanism A and the operation angle-changing mechanism B1 may be coupled in any manner, for example, a manner using hydraulic pressure, or any other manner, as long as the two mechanisms A and B1 are mechanically coupled.

Next, a second embodiment of the invention will be described. This embodiment, similarly to the first embodiment, has a variable compression ratio mechanism A and a variable valve mechanism B. These mechanisms are controlled in substantially the same manner as in the first embodiment. However, in this embodiment, in accordance with the operation of the variable compression ratio mechanism A, the changing of the phase angle of the intake valve 7 is performed in addition to the changing of the operation angle of the amount of lift thereof. In this specification, the "phase angle" means a crank angle that occurs when the lift of the intake valve 7 or the exhaust valve 9 peaks.

Figure 11B:
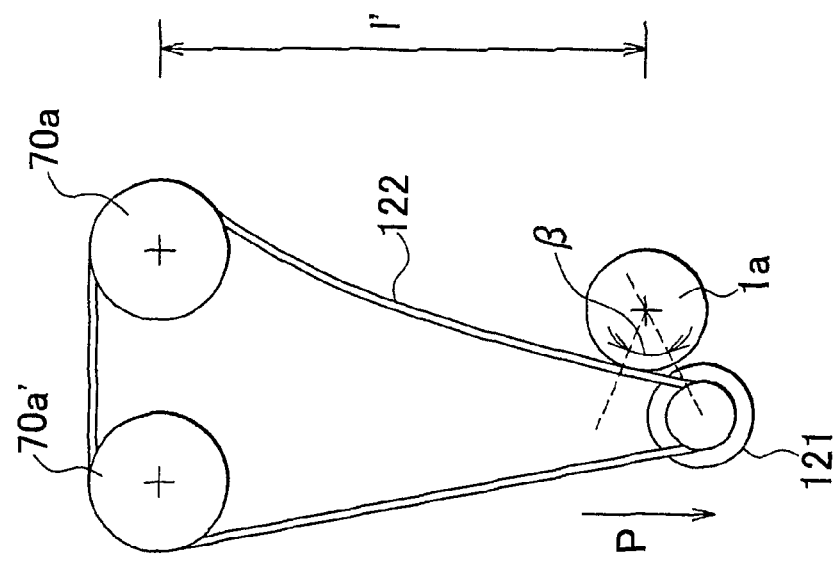
FIGS. 11A and 11B are diagrams showing a timing-related mechanism.
Figure 11A:
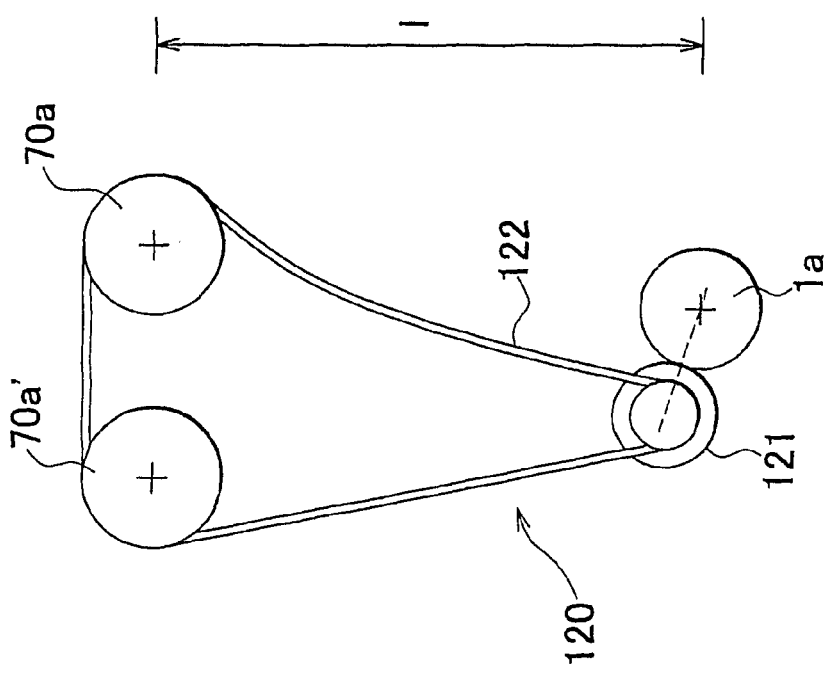

FIGS. 11A and 11B show a timing-related mechanism 120 provided on a side surface of an engine body. The timing-related mechanism 120 has a reduction gear 121 that meshes with a crank sprocket 1a fixed to the crankshaft, and a chain belt 122. The chain belt 122 is wrapped around the reduction gear 121, an intake sprocket 70a coupled to the intake camshaft 70, and an exhaust sprocket 70a' coupled to the exhaust camshaft, and thus causes them to rotate in coordination.

When the variable compression ratio mechanism A operates to move the cylinder head 3 and the like relative to the crankcase 1 in the direction of the arrow L in FIG. 6 and FIGS. 7A to 7C as described above, the distance of the crank sprocket 1a to the intake sprocket 70a and the exhaust sprocket 70a' shortens (from the distance l to the distance l' in FIGS. 11A and 11B). In this embodiment, to prevent the chain belt 122 from slacking when the inter-sprocket distance shortens, the reduction gear 121 is moved relative to the crank sprocket 1a in a direction shown by an arrow P in FIG. 11B. This movement rotates the reduction gear 121 by an angle that corresponds to an angle β shown in FIG. 11B, involving an advancement of the phase angles of the intake valve 7 and the exhaust valve 9.

Figure 12:
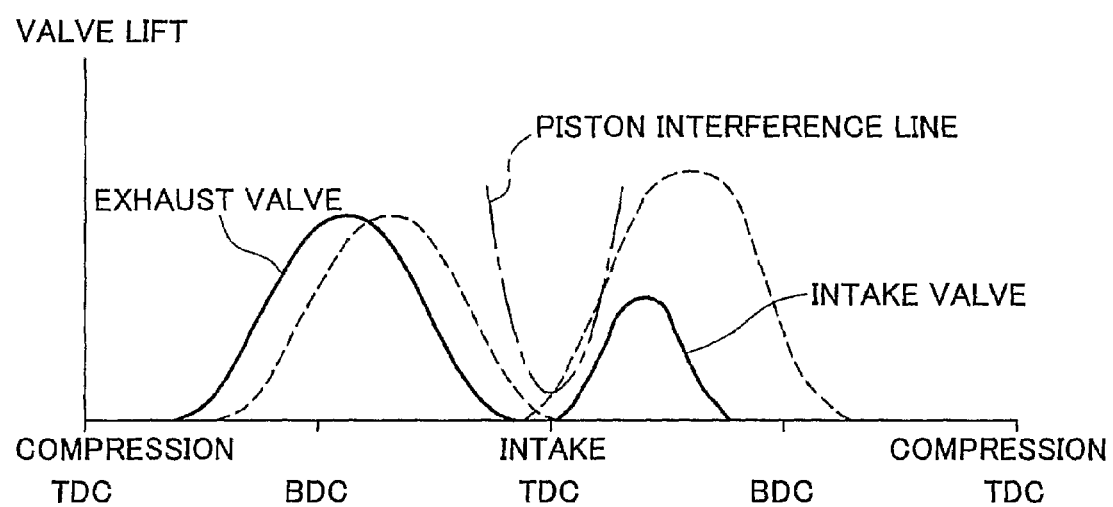
FIG. 12 is a diagram showing changes in the lift of the intake valve and the exhaust valve, and the piston interference line.

FIG. 12 is a diagram similar to FIGS. 9A and 9B which shows lift changes of the intake valve 7 and the exhaust valve 9 and a piston interference line. In FIG. 12, the changes in the valve lift and the like occurring when the mechanical compression ratio is low are shown by dashed lines, and the changes in the valve lift and the like occurring when the mechanical compression ratio is high are shown by solid lines. As can be understood from the diagrams, if the mechanical compression ratio becomes higher, the operation angle and the amount of lift of the intake valve 7 are made smaller, and the timings of the intake valve 7 and the exhaust valve 9 are both advanced. However, the amount of timing advancement of the intake valve 7 is such an amount that the intake valve 7 does not interference with the piston 4.

If the compression ratio is heightened when the engine load is high, that is, when the amount of air charged in the cylinder is large, the possibility of knocking heightens. Therefore, usually, the mechanical compression ratio is heightened only when the engine load is low. In addition, when the engine load is low, there is a need to lessen the amount of air charged in the cylinder. Usually, in that case, the in-cylinder charged air amount is reduced by narrowing the opening of the throttle valve 19.

However, the reduction of the in-cylinder charged air amount by narrowing the opening of the throttle valve 19 results in an increased pumping loss. The in-cylinder charged air amount can be controlled independently of the throttle valve 19, for example, by shifting the closing timing of the intake valve 7 in a direction away from the intake bottom dead center (BDC). Thus, it is preferable to control the in-cylinder charged air amount through the use of the intake valve 7, independently of the throttle valve 19, or in combination with the throttle valve 19.

According to this embodiment, as can be seen from FIG. 12, when the mechanical compression ratio becomes higher, the phase angle of the intake valve 7 is advanced and the closing timing of the intake valve 7 is advanced. Therefore, the pumping loss can be reduced, and therefore the fuel economy can be improved.

In the embodiment, since the phase angle of the exhaust valve 9 is also advanced in conjunction with the advancement regarding the intake valve 7, the interference between the piston 4 and the exhaust valve 9 can be reliably prevented.

Although in the foregoing embodiment, the phase angle of the intake valve 7 is advanced in accordance with the operation of the variable compression ratio mechanism A by the timing-related mechanism 120, any other mechanism may be used as long as the mechanism is able to change the phase angle of the intake valve 7 in accordance with the compression ratio-changing operation amount of the variable compression ratio mechanism A through, via a mechanical construction.

Furthermore, although in the foregoing embodiment, the phase angle of the intake valve 7 and the phase angle of the exhaust valve 9 are both advanced, a construction in which the phase angle of only the intake valve 7 or only the exhaust valve 9 is advanced may instead be adopted.

Next, a third embodiment of the invention will be described. In this embodiment, the variable valve mechanism B includes, besides the operation angle-changing mechanism B1, a phase angle-changing mechanism B2 that is mounted on an end of the camshaft 70 and that is operated to change the phase of a cam of the camshaft 70.

Figure 13:
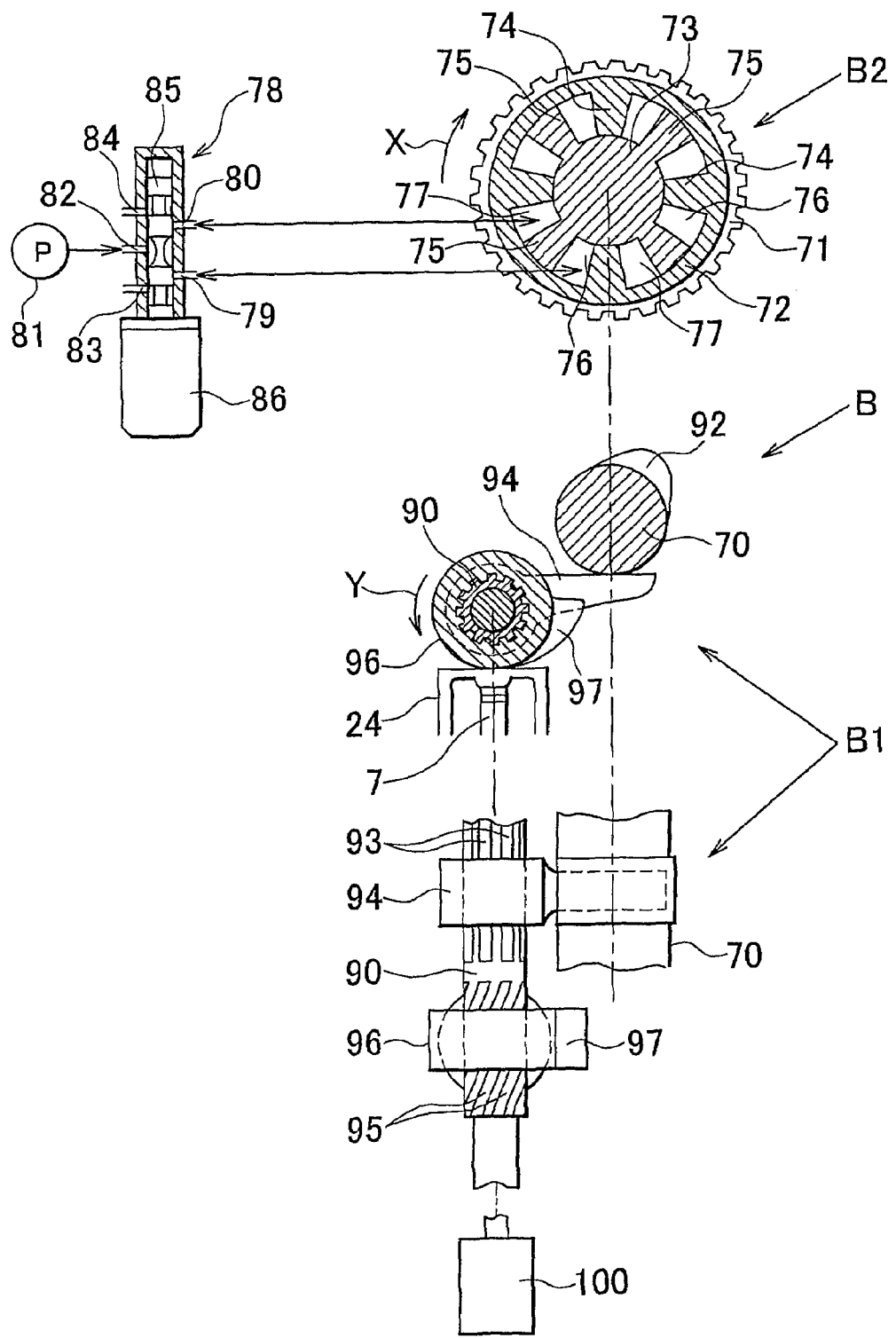
FIG. 13 is a diagram showing a variable valve mechanism of a third embodiment.

FIG. 13 shows an intake variable valve mechanism B provided for the camshaft 70 that is provided for driving the intake valve 7. With reference to FIG. 13, a phase angle-changing mechanism B2 of the intake variable valve mechanism B will be described below. This phase angle-changing mechanism B2 includes: a timing pulley 71 that is rotated in the direction of an arrow X by the crankshaft via a timing belt; a cylindrical housing 72 that rotates together with the timing pulley 71; a rotation shaft 73 that rotates together with the camshaft 70 and that is rotatable relative to the cylindrical housing 72; a plurality of partition walls 74 that extend from an inner peripheral surface of the cylindrical housing 72 to an outer peripheral surface of the rotation shaft 73; and vanes 75 that are located between the partition walls 74 and that extend from the outer peripheral surface of the rotation shaft 73 to the inner peripheral surface of the cylindrical housing 72. On both sides of each vane 75, a timing-advancing hydraulic chamber 76 and a timing-retarding hydraulic chamber 77 are formed.

The supply of working oil to the hydraulic chambers 76, 77 is controlled by a working oil supply control valve 78. The working oil supply control valve 78 includes oil pressure ports 79, 80 connected to the hydraulic chambers 76, 77, respectively, a supply port 82 of the working oil ejected from a hydraulic pump 81, a pair of drain ports 83, 84, and a spool valve 85 that controls the communication/disconnection between the ports 79, 80, 82, 83, 84. The spool valve 85 is controlled by an actuator 86 that is connected to the output port 36 of the electronic control unit 30 by a drive circuit 38.

Figure 14:
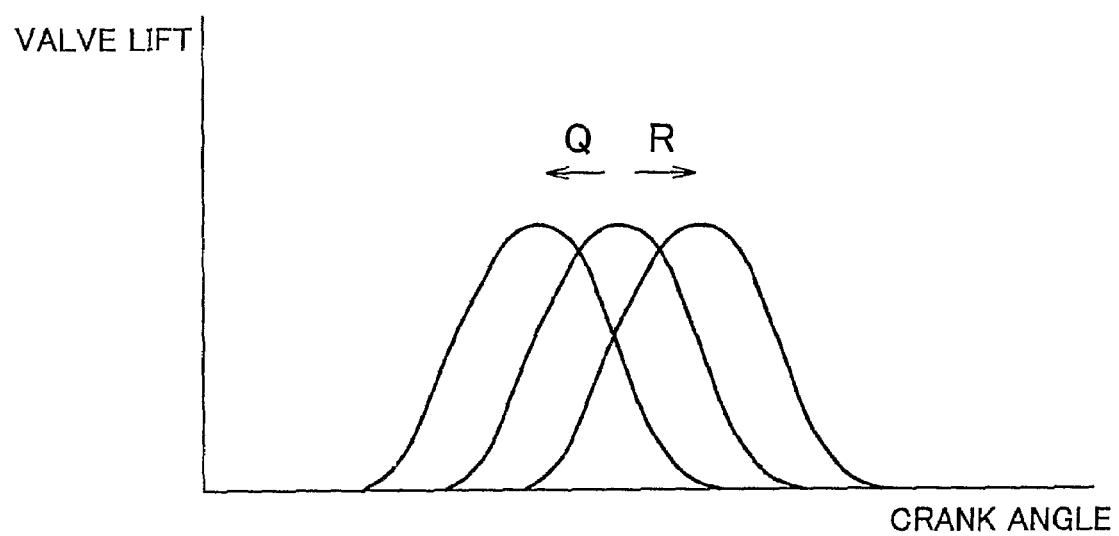
FIG. 14 is a diagram showing the phase angle of the intake valve or the exhaust valve.

When the phase of the cam of the camshaft 70 is to be advanced, the spool valve 85 is moved downward in FIG. 13, so that the working oil supplied thereto through the supply port 82 is supplied via the oil pressure port 79 to the timing-advancing hydraulic chamber 76, and the working oil in the timing-retarding hydraulic chamber 77 is discharged through the drain port 84. At this time, the rotation shaft 73 is relatively rotated in the direction of the arrow X with respect to the cylindrical housing 72. Therefore, the phase angle of the intake valve 7 is advanced (shifted in the direction of an arrow Q in FIG. 14).

On the other hand, when the phase of the cam of the camshaft 70 is to be retarded, the spool valve 85 is moved upward in FIG. 13, so that the working oil supplied thereto through the supply port 82 is supplied via the oil pressure port 80 to the timing-retarding hydraulic chamber 77, and the working oil in the timing-advancing hydraulic chamber 76 is discharged through the drain port 83. At this time, the rotation shaft 73 is relatively rotated in the direction opposite to the direction of the arrow X with respect to the cylindrical housing 72. Therefore, the phase angle of the intake valve 7 is retarded (shifted in the direction of an arrow R in FIG. 14).

If the spool valve 85 is returned to a neutral position shown in FIG. 13 while the rotation shaft 73 is being rotated relative to the cylindrical housing 72, the relative rotation of the rotation shaft 73 is stopped, and the rotation shaft 73 is held at the then relative rotational position. Hence, using the phase angle-changing mechanism B2, the phase of the cam of the camshaft 70 can be advanced or retarded by a desired amount. That is, using the phase angle-changing mechanism B2, the opening timing of the intake valve 7 can be freely advanced or retarded to a given timing.

Thus, the phase angle of the intake valve 7 can be freely changed to a given phase angle by the phase angle-changing mechanism B2.

As described above, in this embodiment, the operation angle-changing mechanism B1 of the variable valve mechanism B is mechanically coupled to the variable compression ratio mechanism A via the link mechanism 100, whereas the phase angle-changing mechanism B2 is not mechanically coupled to the variable compression ratio mechanism A, but is controlled by the electronic control unit 30 in accordance with an engine operation parameter regarding the state of operation of the engine (e.g., the engine load or the engine rotation speed).

Incidentally, the phase angle-changing mechanism B2 shown in FIG. 13 is merely illustrative, and any of various types of phase angle-changing mechanisms other than the mechanism shown in FIG. 13 may also be used. Furthermore, the exhaust variable valve mechanism C has basically the same construction as the intake variable valve mechanism B, and can freely change the phase angle of the exhaust valve 9 to a given phase angle.

Next, with reference to FIGS. 15A, 15B, 15C and 16, examples of controls using the variable compression ratio mechanism A and the variable valve mechanism constructed B as described above will be described. Although the following description will be given in conjunction with a case where the exhaust variable valve mechanism C is not operated, that is, a case where the phase angle, the operation angle and the amount of lift of the exhaust valve 9 remain unchanged, substantially the same controls as described below can be performed with regard to the exhaust variable valve mechanism C as well.

Figure 15A:
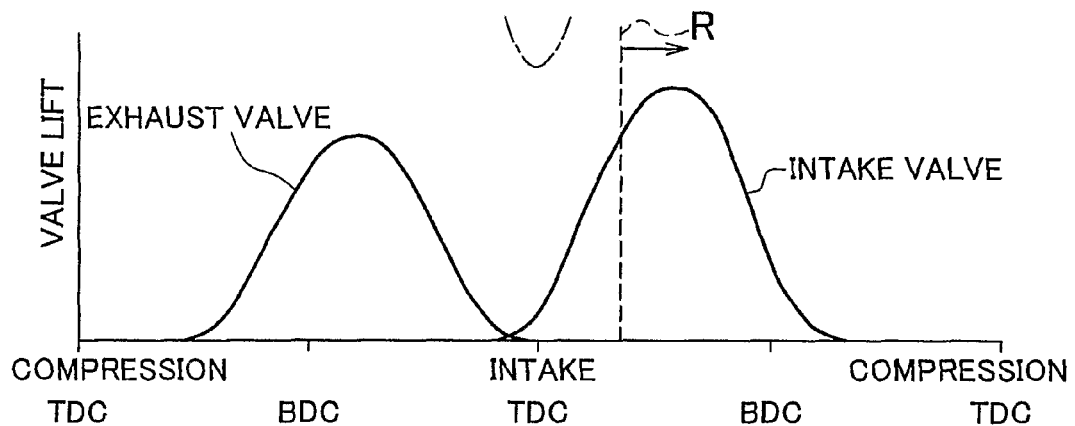
FIGS. 15A, 15B and 15C are diagrams showing changes in the lift of the intake valve and the exhaust valve and a piston interference line in different engine operation regions.
Figure 15B:
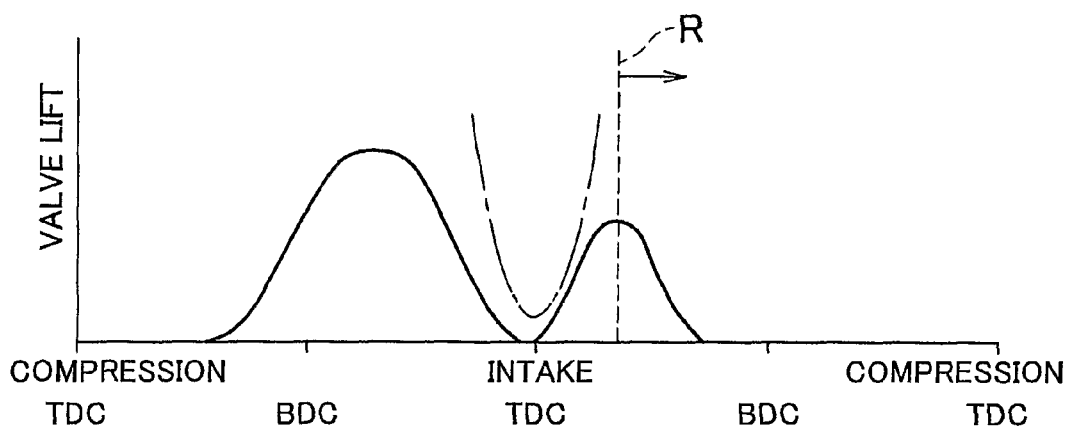
Figure 15C:
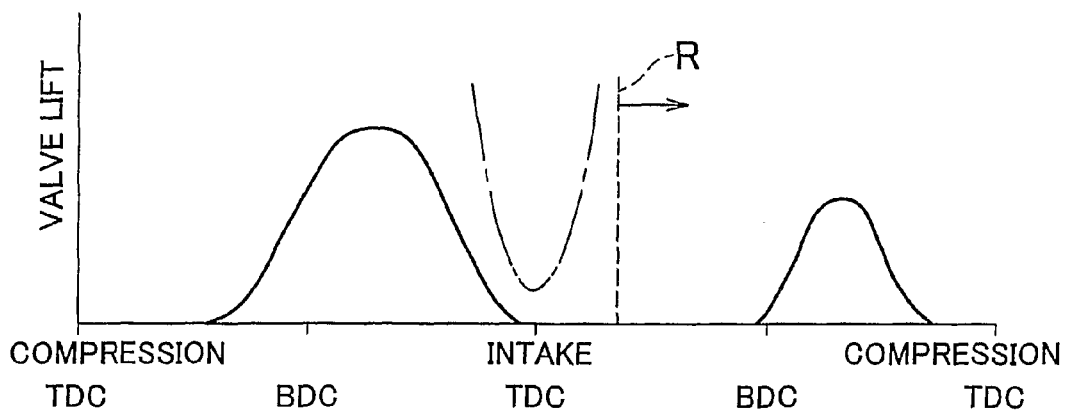
Figure 16:
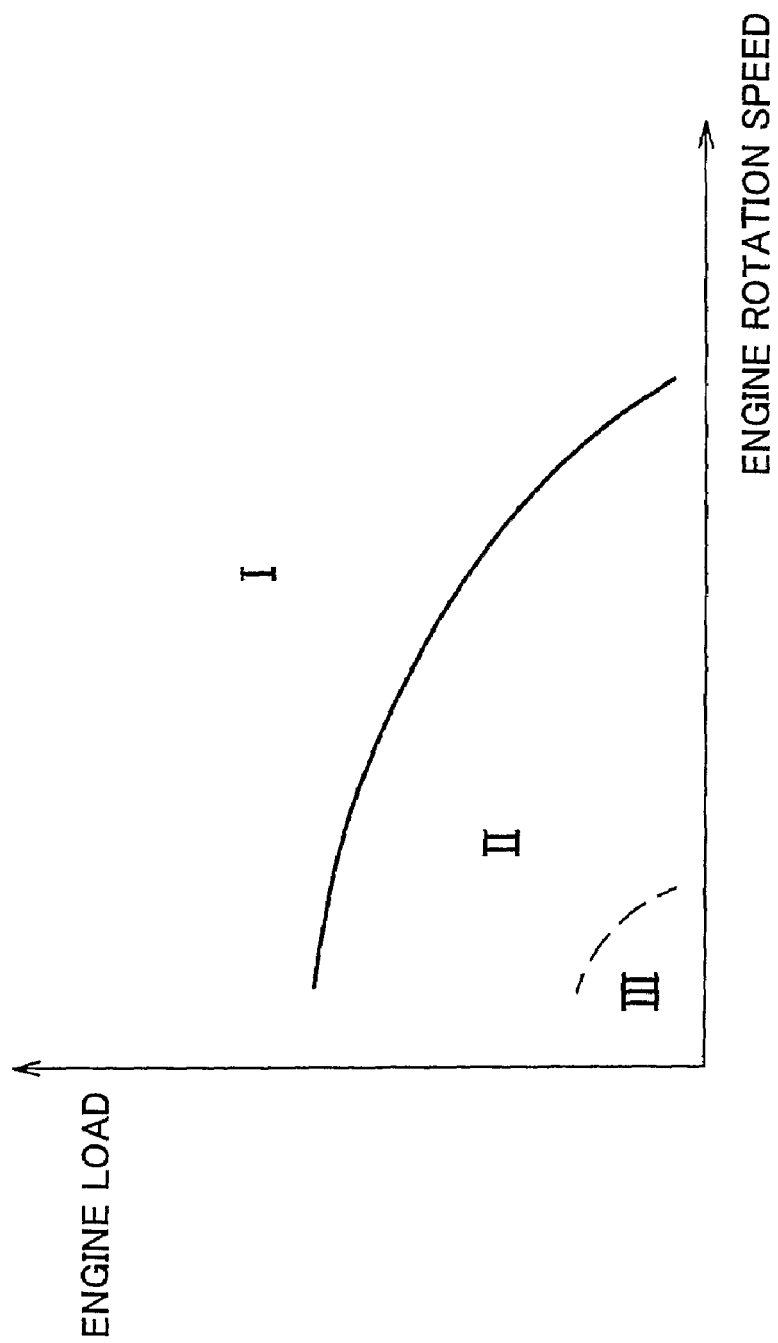
FIG. 16 is a diagram showing operation regions.

FIGS. 15A, 15B and 15C are diagrams each showing lift changes of the intake valve 7 and the exhaust valve 9, and a piston interference line in different engine operation regions. FIG. 16 is a diagram showing engine operation regions. When the engine operation state is within a high-load high-speed region, that is, when the engine operation region is within a region I in FIG. 16, the mechanical compression ratio is made low by the variable compression ratio mechanism A, and the lifts of the intake valve 7 and the exhaust valve 9 are changed as shown in FIG. 15A. That is, since the mechanical compression ratio is made low by the variable compression ratio mechanism A, the operation angle and the amount of lift of the intake valve 7 are correspondingly made large automatically by the link mechanism 100. Besides, the phase angle of the intake valve 7 is controlled by the electronic control unit 30 in accordance with the engine load so that the in-cylinder charged air amount becomes optimal, or so that an operation parameter other than the in-cylinder charged air amount becomes optimal.

Thus, when the engine operation state is within a high-load high-rotation speed region, the mechanical compression ratio is made low so as to prevent knocking; besides, the operation angle and the amount of lift of the intake valve 7 are made large and the phase angle thereof is adjusted to an optimal value, so that a large amount of air can be optimally charged into the cylinder.

When the engine operation state is within a low-load low-rotation speed region, that is, within a region II in FIG. 16, the mechanical compression ratio is made high by the variable compression ratio mechanism A, and the lifts of the intake valve 7 and the exhaust valve 9 are changed as shown in FIG. 15B. That is, since the mechanical compression ratio is made high by the variable compression ratio mechanism A, the operation angle and the amount of lift of the intake valve 7 are correspondingly made small automatically by the link mechanism 100. Besides, the phase angle of the intake valve 7 is advanced by the electronic control unit 30.

Thus, when the engine operation state is within a low-load low-rotation speed state, the thermal efficiency of the internal combustion engine can be heightened by heightening the mechanical compression ratio; besides, the interference between the piston 4 and the intake valve 7 can be prevented since the operation angle and the amount of lift of the intake valve 7 are made small. Besides, since the phase angle of the intake valve 7 is advanced, the pumping loss can be reduced as described above.

Incidentally, in this embodiment, the range of the phase angle of the intake valve 7 controllable by the electronic control unit 30 is restricted. In particular, the phase angle of the intake valve 7 cannot be set on the advanced side of a most-advanced phase angle R. The most-advanced phase angle is a phase angle shown by a dashed line R in FIGS. 15A to 15C, and is the most-advanced phase angle within a range in which the piston 4 and the intake valve 7 do not interfere with each other even when the compression ratio is high. Since the controllable range of the phase angle of the intake valve 7 is set on the retarded side of the most-advanced phase angle R, this embodiment reliably prevents the interference between the piston 4 and the intake valve 7 over the entire engine operation region.

Furthermore, at the time of a cold start of the internal combustion engine, that is, when the in-cylinder temperature is low and the engine operation state is within a region III in FIG. 16, the mechanical compression ratio is made high by the variable compression ratio mechanism A, and the lifts of the intake valve 7 and the exhaust valve 9 are changed as shown in FIG. 15C. That is, the mechanical compression ratio is made high by the variable compression ratio mechanism A, and the operation angle and the amount of lift of the intake valve 7 are made small automatically by the link mechanism 100, and the phase angle of the intake valve 7 is retarded by the electronic control unit 30.

Thus, at the time of a cold start of the internal combustion engine, the in-cylinder temperature can be quickly raised since the mechanical compression ratio is made high and the opening timing of the intake valve 7 is retarded.

Incidentally, although in the foregoing embodiment, the mechanical compression ratio is changed in a fashion of two divided regions of the engine operation during ordinary operation of the internal combustion engine (i.e., other than the cold start), that is, the high-load high-rotation speed region, and the low-load low-rotation speed region, the engine operation region may also be divided into three or more regions, and the mechanical compression ratio and the like may be correspondingly changed. Furthermore, the mechanical compression ratio and the like may also be changed continuously in accordance with the engine operation state.

Next, a fourth embodiment of the invention will be described. The construction of this embodiment is basically the same as that of the third embodiment, except that the construction of a phase angle-changing mechanism B2 is different from that of the phase angle-changing mechanism of the third embodiment, as described below.

Figure 17:
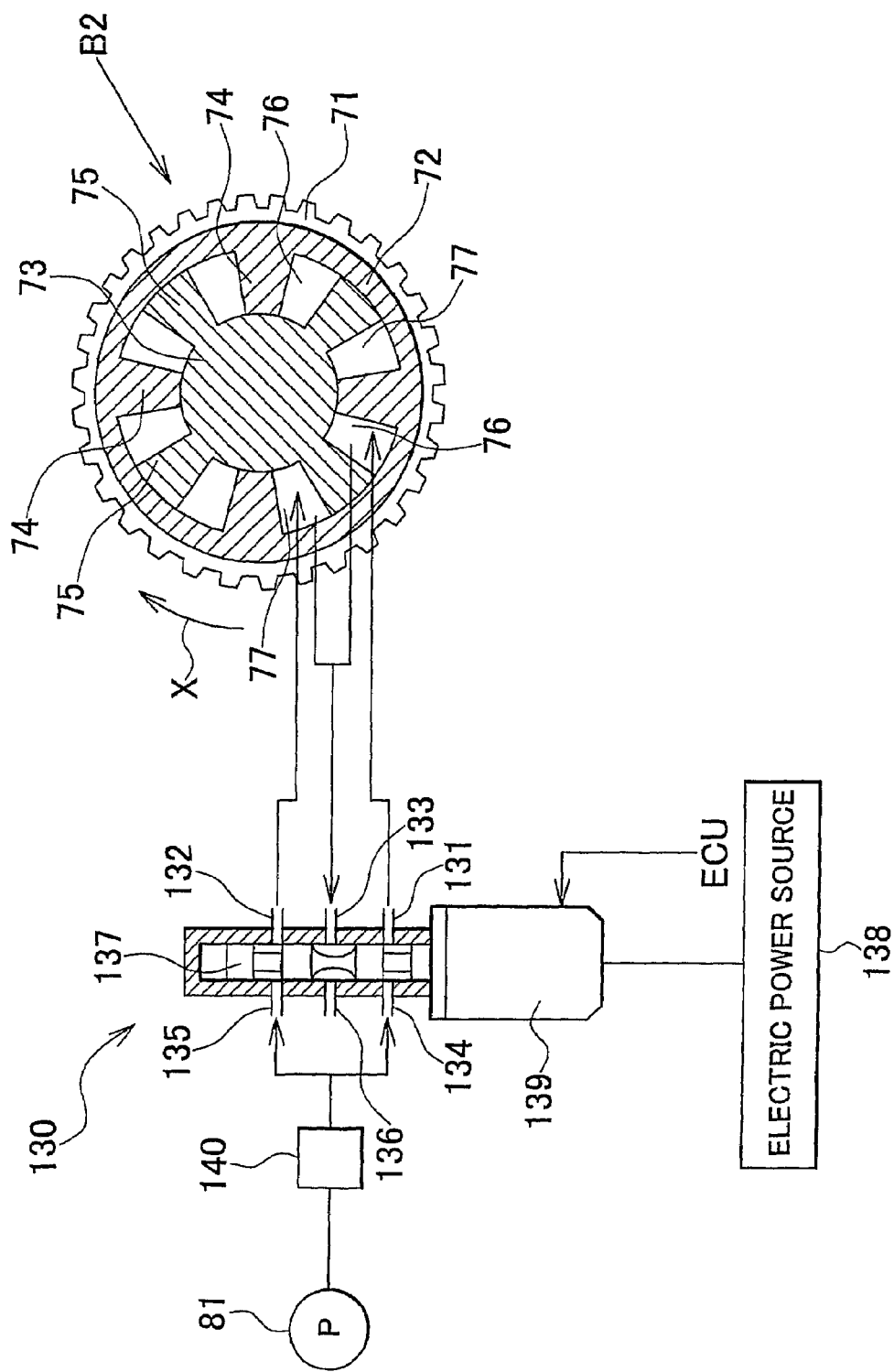
FIG. 17 is a diagram showing a phase angle-changing mechanism of a fourth embodiment of the invention.

FIG. 17 is a diagram showing the construction of the phase angle-changing mechanism B2 in this embodiment. The phase angle-changing mechanism B2, as in the foregoing embodiments, includes a timing pulley 71, a cylindrical housing 72, a rotation shaft 73, partition walls 74, and vanes 75. On both sides of each vane 75, a timing-advancing hydraulic chamber 76 and a timing-retarding hydraulic chamber 77 are formed.

The supply of working oil to the hydraulic chambers 76, 77 is controlled by a working oil supply control valve 130. The working oil supply control valve 130 includes oil pressure supply ports 131, 132 that supply working oil to the hydraulic chambers 76, 77, respectively, an oil pressure discharge port 133 for discharging working oil from the hydraulic chambers 76, 77, a pair of supply ports 134, 135 that supply the working oil ejected from a hydraulic pump 81, a drain port 136, and a spool valve 137 that controls the communication/disconnection between the ports 131, 132, 133, 134, 135, 136. The spool valve 137 is controlled by an actuator 139. The actuator 139 is supplied with electric power from an electric power source 138, and is controlled by an output of the electronic control unit 30.

In this embodiment, the timing-advancing hydraulic chamber 76 and the timing-retarding hydraulic chamber 77 are both connected to the oil pressure discharge port 133. From these hydraulic chambers 76, 77, working oil is always discharged via the oil pressure discharge port 133 and the drain port 136, independently of the operational position of the spool valve 137.

When the spool valve 137 is at the neutral position shown in FIG. 17, the timing-advancing hydraulic chamber 76 and the timing-retarding hydraulic chamber 77 are both supplied with working oil via the oil pressure supply ports 132, 133, respectively so that the amount of working oil supplied to the hydraulic chambers 76, 77 balances with the amount of working oil discharged therefrom. Thus, the rotation of the rotation shaft 73 relative to the cylindrical housing 72 is stopped.

When the spool valve 137 is moved upward in FIG. 17, the timing-advancing hydraulic chamber 76 is supplied with working oil since the oil pressure supply port 131 is open, and the timing-retarding hydraulic chamber 77 discontinues to be supplied with the working oil since the oil pressure supply port 132 is closed. As a result, since the working oil is discharged from the timing-retarding hydraulic chamber 77 without any working oil supplied thereto, the rotation shaft 73 is relatively rotated in the direction of the arrow X with respect to the cylindrical housing 72, and thus the phase angle of the intake valve 7 is advanced.

Conversely, if the spool valve 137 is moved downward in FIG. 17, the timing-retarding hydraulic chamber 77 is supplied with working oil since the oil pressure supply port 132 is open, whereas the timing-advancing hydraulic chamber 76 discontinues to be supplied with working oil since the oil pressure supply port 131 is closed. As a result, since working oil is discharged from the timing-advancing hydraulic chamber 76 without any working oil supplied thereto, the rotation shaft 73 is relatively rotated in the direction opposite to the direction of the arrow X with respect to the cylindrical housing 72, and thus the phase angle of the intake valve 7 is retarded.

In the working oil supply control valve 130 in this embodiment, the working oil is always discharged from the timing-advancing hydraulic chamber 76 and the timing-retarding hydraulic chamber 77. Therefore, if the supply of the working oil from the hydraulic pump 81 stops, the working oil is discharged from both the timing-advancing hydraulic chamber 76 and the timing-retarding hydraulic chamber 77. In such a case, the rotation shaft 73 is relatively rotated, due to its inertia, furthest to the advanced side with respect to the cylindrical housing 72.

Figure 18A:
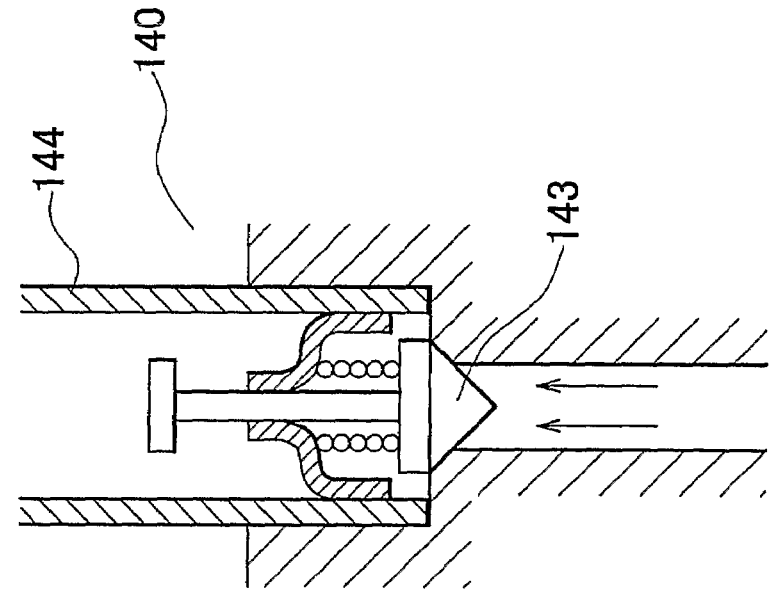
FIGS. 18A and 18B are diagrams showing a supply shut-off valve.
Figure 18B:
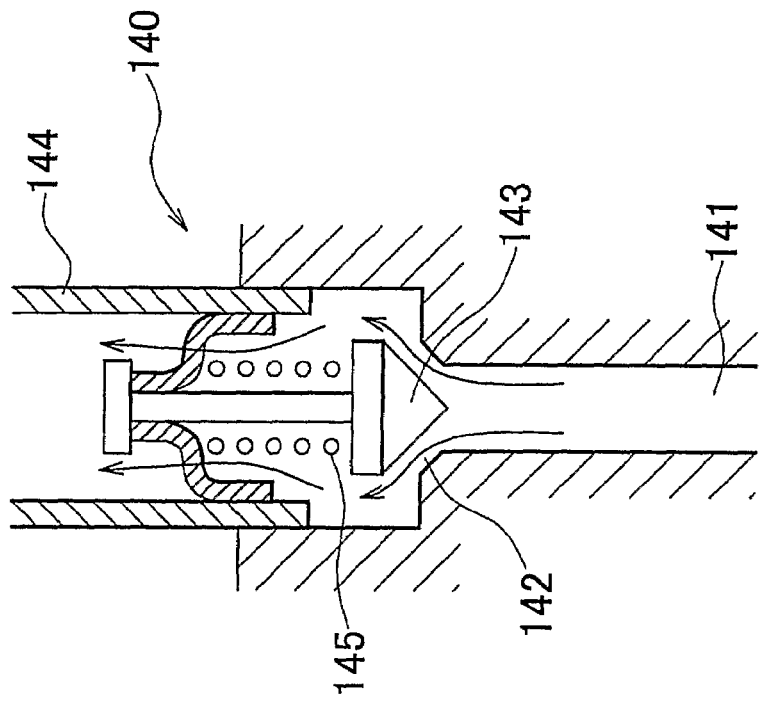

In this embodiment, a supply shut-off valve 140 as shown in FIGS. 18A and 18B is provided between the hydraulic pump 81 and the working oil supply control valve 130. The supply shut-off valve 140, in this embodiment, provided within an oil passageway 141 that is formed within the cylinder head 3. The supply shut-off valve 140 includes a valve body 143 that opens and closes an opening portion 142 of the oil passageway 141, and a pipe-like member 144 that is directly or indirectly connected to the crankcase 1 and that moves in accordance with the relative movement of the crankcase 1 with respect to the cylinder head 3.

The valve body 143 is coupled to the pipe-like member 144, and basically, is moved along with the movement of the pipe-like member 144. Therefore, when the pipe-like member 144 moves in a direction away from the opening portion 142 of the oil passageway 141, the valve body 143 departs from the opening portion 142, opening the opening portion 142. Conversely, when the pipe-like member 144 moves in the direction toward the opening portion 142, the valve body 143 approaches the opening portion 142, and closes the opening portion 142. Incidentally, a spring 145 is provided between the valve body 143 and the pipe-like member 144.

When the mechanical compression ratio determined by the variable compression ratio mechanism A is low, that is, when the distance between the crankcase 1 and the cylinder head 3 is long, the pipe-like member 144 is positioned apart from the opening portion 142 as shown in FIG. 18A, and therefore the opening portion 142 is open. When the mechanical compression ratio is heightened by the variable compression ratio mechanism A, that is, when the distance between the crankcase 1 and the cylinder head 3 becomes shorter, the pipe-like member 144 correspondingly approaches the opening portion 142 as shown in FIG. 18B, so that the opening portion 142 is closed by the valve body 143.

That is, in this embodiment, when the mechanical compression ratio determined by the variable compression ratio mechanism A is low, the working oil is supplied from the hydraulic pump 81 to the working oil supply control valve 130. When the mechanical compression ratio is heightened by the variable compression ratio mechanism A, the supply of the working oil from the hydraulic pump 81 to the working oil supply control valve 130 is shut off by the supply shut-off valve 140. Therefore, the working oil is discharged from both the timing-advancing hydraulic chamber 76 and the timing-retarding hydraulic chamber 77, so that the rotation shaft 73 is relatively rotated, due to its inertia, furthest to the advanced side with respect to the cylindrical housing 72. Thus, the phase angle of the intake valve 7 is retarded.

That is, according to this embodiment, when the mechanical compression ratio is heightened by the variable compression ratio mechanism A, the phase angle of the intake valve 7 is retarded. Thus, since the phase angle of the intake valve 7 is retarded when the mechanical compression ratio is high, the interference between the piston 4 and the intake valve 7 can be reliably prevented.

In this embodiment, the operation angle-changing mechanism B1 may be controlled by an actuator that is controlled in accordance with an output of the electronic control unit 30, instead of being mechanically coupled to the variable compression ratio mechanism via the link mechanism 100 or the like. Besides, the working oil supply control valve 78 shown in FIG. 13 may also be used as a working oil supply control valve.

The foregoing control method for the variable valve mechanism can be used not only for the foregoing variable valve mechanism, but may also be used for various other types of variable valve mechanisms. For example, the control method can be also applied to a variable valve mechanism that has two cams whose cam profiles are different from each other, and that hydraulically selects from these two cams a cam that acts on the intake valve.

When the mechanical compression ratio is heightened by the variable compression ratio mechanism A, a method different from the foregoing method may be used to retard the phase angle of the intake valve 7. For example, a switch coupled mechanically to the variable compression ratio mechanism A may be provided between the electric power source 138 and the actuator 139 provided for driving the spool valve 137 of the working oil supply control valve 130, and this switch may be turned off to prevent the supply of electric power to the actuator 139 when the mechanical compression ratio is heightened by the variable compression ratio mechanism A. The actuator 139 is constructed so that, when shut off from the supply of electric power, the actuator 139 moves the spool valve 137 downward in FIG. 17. Therefore, at that time, the rotation shaft 73 is relatively rotated, due to its inertia, furthest to the advanced side with respect to the cylindrical housing 72, and thus the phase angle of the intake valve 7 is retarded.

Or, in order to retard the phase angle of the intake valve 7 when the mechanical compression ratio is heightened by the variable compression ratio mechanism A, a mechanism substantially the same as the mechanism shown in FIGS. 11A and 11B may also be used. For example, if the reduction gear 121 is disposed on a side of the crank sprocket 1a that is opposite from the side shown in FIGS. 11A and 11B, it becomes possible to retard the phase angle of the intake valve 7 when the mechanical compression ratio is heightened. In addition, according to this construction, the phase angle can be retarded continuously in accordance with the mechanical compression ratio.

Next, a fifth embodiment of the invention will be described. This embodiment, similarly to the embodiment, has a variable compression ratio mechanism A and a variable valve mechanism B. These mechanisms in this embodiment are controlled in substantially the same manner as in the foregoing embodiments. However, in this embodiment, the link mechanism 100 is not coupled in a direct fashion as shown in FIG. 4, 6 or 7, but is coupled as shown in FIG. 19.

Figure 19:
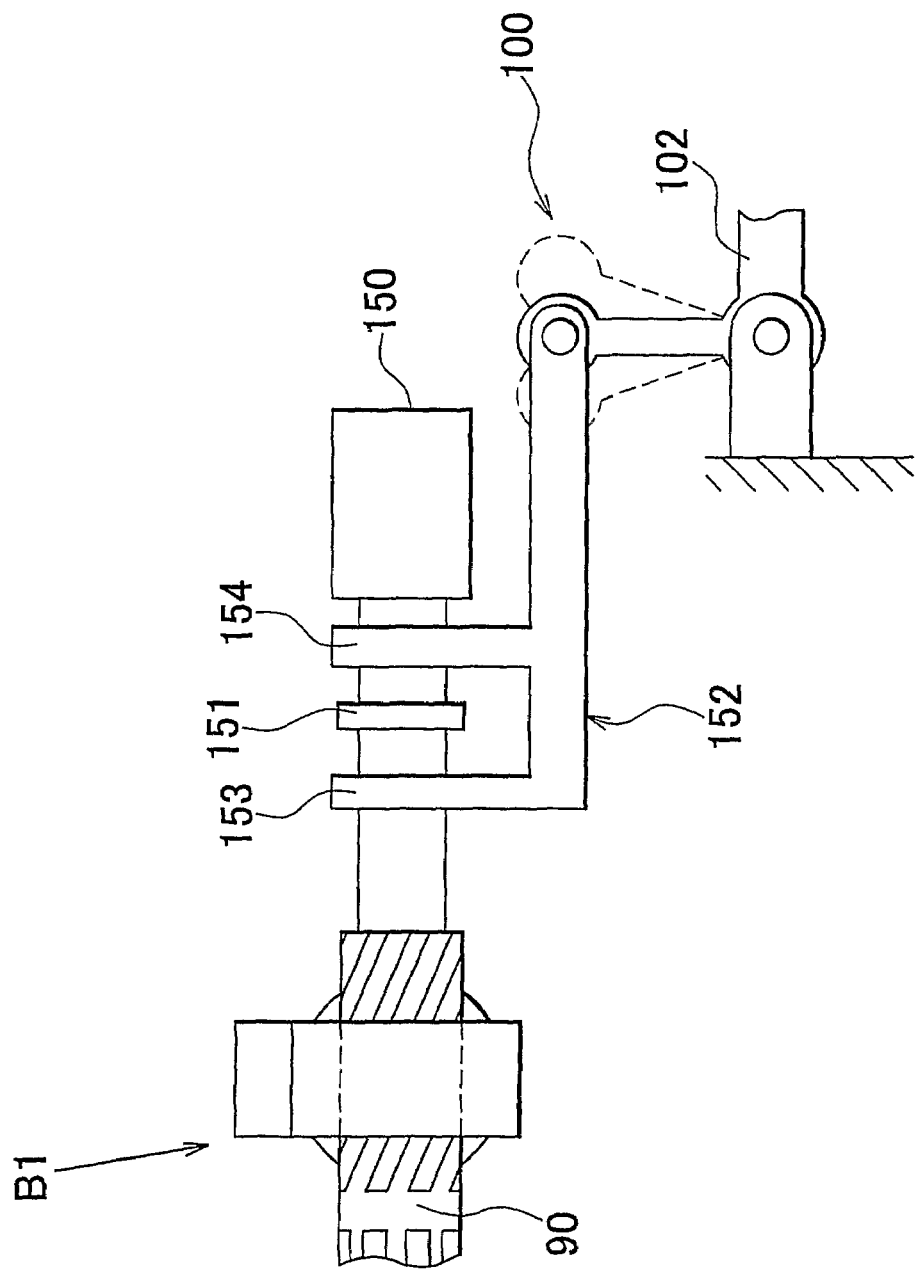
FIG. 19 is a diagram showing a form of coupling between an operation angle-changing mechanism and a link mechanism in a fifth embodiment.

As shown in FIG. 19, the control rod 90 of the operation angle-changing mechanism B1 is driven in the direction of the axis thereof by an actuator 150, and has, in the vicinity of the actuator 150, a protruded portion 151 that is protruded from an outer peripheral surface of the control rod 90. On the other hand, the mobile-side member 102 of the link mechanism 100 is coupled with a movement restriction member 152. The movement restriction member 152 has two annular stopper members 153, 154 that are positioned on the outer peripheral surface of the control rod 90. The annular stopper members 153, 154 are slidable on the control rod 90 in the direction of the axis of the control rod 90. The protruded portion 151 of the control rod 90 is located between the two annular stopper members 153, 154.

When the control rod 90 is moved in either direction along the axis thereof by the actuator 150, the protruded portion 151 comes into contact with a corresponding one of the annular stopper members 153, 154, so that the control rod 90 cannot be further moved in that direction. That is, the movement of the control rod 90 is restricted by the annular stopper members 153, 154 so that the control rod 90 can be moved only within the range between the annular stopper members 153, 154. This means that the operation angle and the amount of lift of the intake valve 7 are restricted within predetermined ranges.

On the other hand, the movement restriction member 152 is coupled to the link mechanism 100 so as to be moved in the direction of the axis of the control rod 90 in accordance with the compression ratio-changing operation amount of the variable compression ratio mechanism A. This means that, in accordance with the compression ratio-changing operation amount of the variable compression ratio mechanism A, that is, in accordance with the mechanical compression ratio set by the variable compression ratio mechanism A, the range in which the control rod 90 can be moved is changed, and therefore the ranges of the operation angle and the amount of lift of the intake valve 7 in which they can be changed by the actuator 150 are changed.

Figure 20:
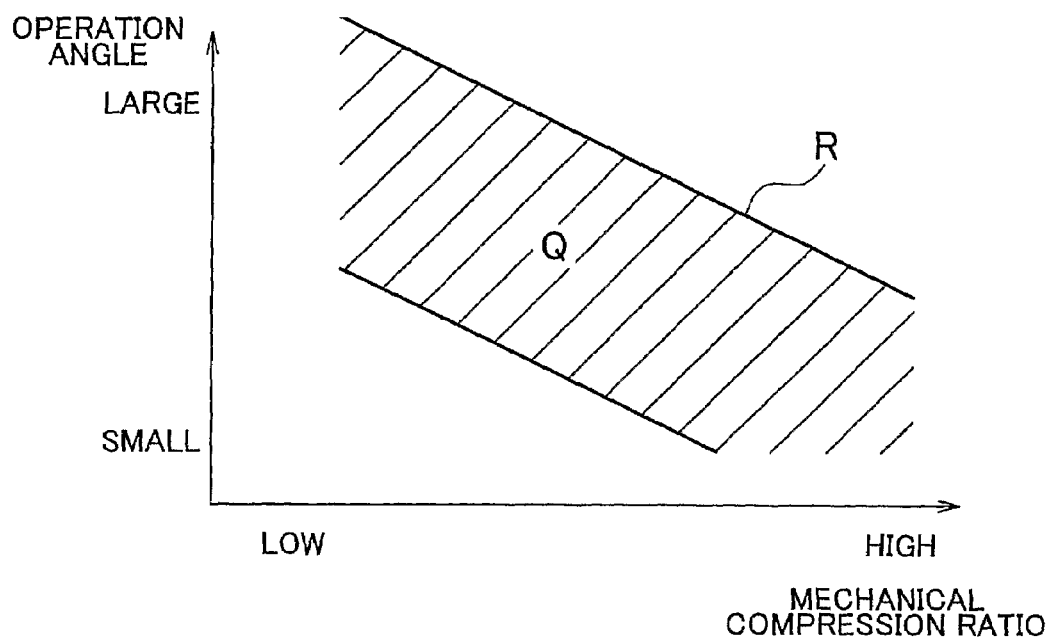
FIG. 20 is a diagram showing a range in which the operation angle can be changed in the fifth embodiment.

FIG. 20 is a diagram showing an example of a relationship between the mechanical compression ratio and the range of the operation angle in which it can be changed by the actuator 150. In FIG. 20, a region Q shown by hatching represents the range of the operation angle in which it can be changed by the actuator 150. In the example shown in FIG. 20, as the mechanical compression ratio is made higher by the variable compression ratio mechanism A, the range of the operation angle in which it can be changed by the actuator 150 is shifted to smaller operation angles. That is, when the mechanical compression ratio is low, the upper limit value (shown by a straight line R in FIG. 20) of the range of the operation angle in which it can be changed by the actuator 150 is large. When the mechanical compression ratio is made high by the variable compression ratio mechanism A, the upper limit value of the range of the operation angle in which it can be changed by the actuator 150 is made small.

Since the upper limit value of the range in which it can be changed by the actuator 150 is made small when the mechanical compression ratio is made high as described above, the interference between the piston 4 and the intake valve 7 can be prevented even when the mechanical compression ratio is high. Furthermore, since the operation angle of the intake valve 7 can be changed, although in a predetermined range, in accordance with the engine operation state, it becomes possible to optimally operate the internal combustion engine.

Incidentally, the amount of valve lift can also be controlled in substantially the same manner as in the example shown in FIG. 20. This will also make it possible to optimally operate the internal combustion engine while preventing interference between the piston 4 and the intake valve 7. In addition, this embodiment is also applicable to the exhaust variable valve mechanism C.

Although in the foregoing embodiment, the ranges of the operation angle and the amount of valve lift in which they can be changed by the actuator are changed in accordance with the mechanical compression ratio, the range of the phase angle in which it can be changed by the actuator may also be changed in accordance with the mechanical compression ratio. This will be accomplished by combining the timing-related mechanism 120 shown in FIGS. 11A and 11B and the phase angle-changing mechanism B2 shown in FIG. 13. In this case, if the mechanical compression ratio heightens, the advanced-side limit angle of the range of the phase angle in which the phase angle can be changed by the actuator is retarded. This makes it possible to prevent interference between the piston 4 and the intake valve 7 and also change the phase angle of the intake valve 7, although in a predetermined range, in accordance with the engine operation state through the use of the actuator. Therefore, the internal combustion engine can be optimally operated.

Figure 21:
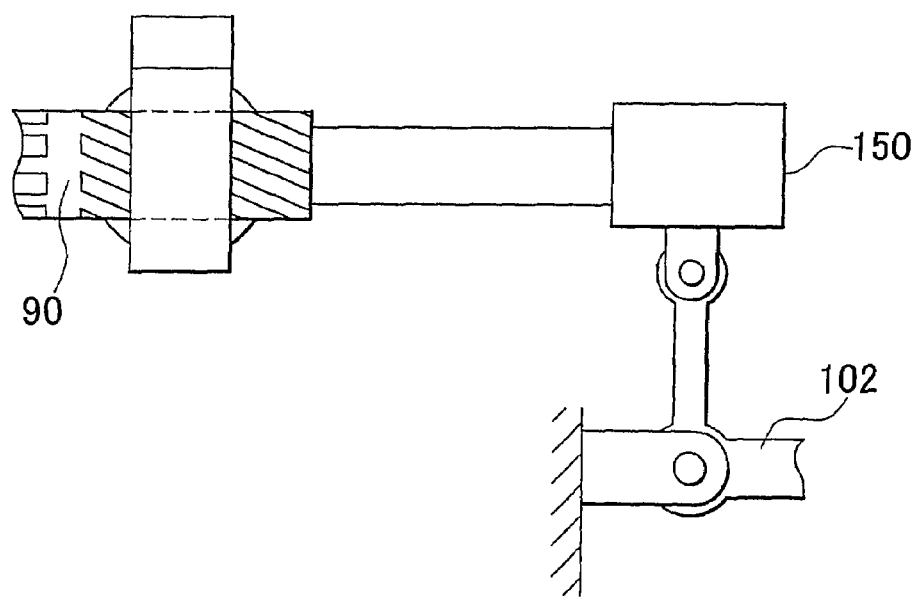
FIG. 21 is a diagram showing a modification of the fifth embodiment.

Furthermore, instead of providing the movement restriction member 152, the actuator 150 may be coupled directly to the mobile-side member 102 of the link mechanism 100 as shown in FIG. 21. By adopting this construction, too, the relationship between the mechanical compression ratio and the range of the phase angle in which it can be changed by the actuator 150 can be caused to be as shown in FIG. 20.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. A spark ignition type internal combustion engine comprising:
    a variable compression ratio mechanism that changes a mechanical compression ratio; and
    a variable valve mechanism that changes a first valve characteristic of an intake valve or an exhaust valve,
    wherein the variable valve mechanism is mechanically coupled to the variable compression ratio mechanism, and the variable valve mechanism is controlled in accordance with a compression ratio-changing operation amount of the variable compression ratio mechanism, and
    the first valve characteristic of the intake valve or the exhaust valve in the variable valve mechanism is controlled in accordance with the compression ratio-changing operation amount of the variable compression ratio mechanism,
    the spark ignition type internal combustion engine further comprising a phase angle-changing mechanism that changes a second valve characteristic of the intake valve or the exhaust valve, which is different from the first valve characteristic that is changed by the variable valve mechanism,
    wherein the phase angle-changing mechanism is a timing-related mechanism that is mechanically coupled to the variable compression ratio mechanism and to the variable valve mechanism, and
    wherein the variable compression ratio mechanism changes the mechanical compression ratio by relatively moving a crankcase and a cylinder head with respect to each other, and the variable valve mechanism is mechanically controlled in accordance with a relative positional relationship between the crankcase and the cylinder head.

2. The spark ignition type internal combustion engine according to claim 1, wherein the variable valve mechanism includes a link mechanism, and is coupled to the variable compression ratio mechanism by the link mechanism.

3. The spark ignition type internal combustion engine according to claim 2, wherein the variable compression ratio mechanism includes an actuator for changing the mechanical compression ratio, and the link mechanism is coupled to the actuator.

4. The spark ignition type internal combustion engine according to claim 1, wherein the variable valve mechanism is an operation angle-changing mechanism that changes an operation angle of the intake valve or the exhaust valve, and the operation angle-changing mechanism controls the operation angle of the intake valve or the exhaust valve so that the operation angle lessens if the mechanical compression ratio is heightened by the variable compression ratio mechanism.

5. The spark ignition type internal combustion engine according to claim 1, wherein the variable valve mechanism is a lift amount-changing mechanism that changes a lift amount of the intake valve or the exhaust valve, and the lift amount-changing mechanism controls the lift amount of the intake valve or the exhaust valve so that the lift amount lessens if the mechanical compression ratio is heightened by the variable compression ratio mechanism.

6. The spark ignition type internal combustion engine according to claim 1, wherein the phase angle-changing mechanism is controlled independently of the variable compression ratio mechanism or the variable valve mechanism.

7. The spark ignition type internal combustion engine according to claim 6, wherein the phase angle-changing mechanism retards the phase angle of at least the intake valve of the intake valve and the exhaust valve, if the mechanical compression ratio is heightened by the variable compression ratio mechanism at a time of a cold start of the internal combustion engine.

8. The spark ignition type internal combustion engine according to claim 1, wherein the phase angle-changing mechanism advances a phase angle of at least the intake valve of the intake valve and the exhaust valve, if an engine load lessens.

9. The spark ignition type internal combustion engine according to claim 1, wherein the phase angle-changing mechanism advances a phase angle of at least the intake valve of the intake valve and the exhaust valve, if the mechanical compression ratio is heightened by the variable compression ratio mechanism.

10. The spark ignition type internal combustion engine according to claim 1, wherein the variable valve mechanism changes the first valve characteristic of the intake valve or the exhaust valve in the variable valve mechanism in accordance with the compression ratio-changing operation amount of the variable compression ratio mechanism and also with an engine operation parameter other than the compression ratio-changing operation amount of the variable compression ratio mechanism, and a range of the first valve characteristic of the intake valve or the exhaust valve in which the first valve characteristic is changeable in accordance with the engine operation parameter other than the compression ratio-changing operation amount of the variable compression ratio mechanism is controlled in accordance with the compression ratio-changing operation amount of the variable compression ratio mechanism.

11. The spark ignition type internal combustion engine according to claim 10, wherein the variable valve mechanism is an operation angle-changing mechanism that changes an operation angle of the intake valve or the exhaust valve and the operation angle-changing mechanism restricts the range of the operation angle in which the operation angle is changeable so that an upper limit value of the range of the operation angle is lessened if the mechanical compression ratio is heightened by the variable compression ratio mechanism.

12. The spark ignition type internal combustion engine according to claim 10, wherein the variable valve mechanism is a lift amount-changing mechanism that changes a lift amount of the intake valve or the exhaust valve and the lift amount-changing mechanism restricts the range of the lift amount in which the lift amount is changeable so that an upper limit value of the range of the lift amount is lessened if the mechanical compression ratio is heightened by the variable compression ratio mechanism.

13. The spark ignition type internal combustion engine according to claim 10, wherein:
the phase angle-changing mechanism changes a phase angle of the intake valve, and
the phase angle-changing mechanism advances the phase angle of the intake valve and retards an advanced-side limit angle of the range of the phase angle in which the phase angle is changeable, if the mechanical compression ratio is heightened by the variable compression ratio mechanism.

14. The spark ignition type internal combustion engine according to claim 1, wherein the variable valve mechanism is controlled in accordance with the compression ratio-changing operation amount of the variable compression ratio mechanism so that a distance between a piston and the intake valve or the exhaust valve when the piston is at a compression top dead center is substantially constant.

15. The spark ignition type internal combustion engine according to claim 1, wherein the variable valve mechanism includes a control rod disposed parallel to a camshaft and the variable valve mechanism changes the first characteristic of the intake valve or the exhaust valve when the control rod moves in a direction parallel to the axis thereof.

16. The spark ignition type internal combustion engine according to claim 15, wherein the variable valve mechanism further includes a stationary-side member coupled to the crankcase at a first end and includes a pin at a second end, a mobile-side member coupled to the cylinder head, the mobile-side member includes a first leg portion which includes a slot in which the pin is slidable and a second leg portion that is coupled to the control rod, and an oscillating shaft about which the mobile-side member oscillates, such that the control rod moves in accordance with the relative positional relationship between the crankcase and the cylinder head.

17. The spark ignition type internal combustion engine according to claim 15, wherein the variable valve mechanism further includes a coupling rod with a first end coupled to the crankcase and a second end that includes a rack, and a pinion disposed on the control rod that is meshed with the rack, such that the control rod moves in accordance with the relative positional relationship between the crankcase and the cylinder head.

18. The spark ignition type internal combustion engine according to claim 1, wherein the phase angle-changing mechanism includes a reduction gear that meshes with a crank sprocket fixed to a crank shaft, an intake sprocket coupled to an intake camshaft, an exhaust sprocket coupled to an exhaust camshaft, and a chain belt wrapped around the reduction gear, intake sprocket and exhaust sprocket.

19. The spark ignition type internal combustion engine according to claim 1, wherein the phase angle-changing mechanism includes a timing pulley that is rotated by an intake camshaft or an exhaust camshaft, a cylindrical housing that rotates together with the timing pulley, a rotation shaft that rotates together with the intake camshaft or the exhaust camshaft and rotates relative to the cylindrical housing, a plurality of partition walls that extend from an inner peripheral surface of the cylindrical housing to an outer peripheral surface of the rotation shaft, vanes located between the partition walls that extend from the outer peripheral surface of the rotation shaft to the inner peripheral surface of the cylindrical housing, and a timing-advancing hydraulic chamber and a timing-retarding hydraulic chamber disposed on both sides of each vane.

* * * * *